United States Patent
Lin et al.

(10) Patent No.: US 6,980,211 B2
(45) Date of Patent: Dec. 27, 2005

(54) AUTOMATIC SCHEMATIC DIAGRAM GENERATION USING TOPOLOGY INFORMATION

(75) Inventors: Shyh-Chang Lin, Hsin-Chu (TW); Chia-Huei Lee, Hsin-Chu (TW); Yu-Sheng Lu, Hsin-Chu (TW); Bang-Hwa Ho, Hsin-Chu (TW)

(73) Assignee: Springsoft, Inc., Hsinchu (TW)

( * ) Notice: Subject to any disclaimer, the term of this patent is extended or adjusted under 35 U.S.C. 154(b) by 0 days.

(21) Appl. No.: 10/064,035

(22) Filed: Jun. 4, 2002

(65) Prior Publication Data

US 2003/0222872 A1 Dec. 4, 2003

(51) Int. Cl.[7] .......................... G06T 11/20; G06F 17/50
(52) U.S. Cl. ...................... 345/440; 715/964; 715/716; 715/12
(58) Field of Search ......................... 345/440; 715/964; 716/12

(56) References Cited

U.S. PATENT DOCUMENTS

| | | | | |
|---|---|---|---|---|
| 5,517,607 A | * | 5/1996 | Nishimura et al. | 715/853 |
| 5,555,201 A | * | 9/1996 | Dangelo et al. | 716/1 |
| 5,691,912 A | * | 11/1997 | Duncan | 716/11 |
| 5,850,349 A | * | 12/1998 | Hirai et al. | 716/12 |
| 5,910,899 A | * | 6/1999 | Barrientos | 716/8 |
| 6,145,117 A | * | 11/2000 | Eng | 716/18 |
| 6,295,633 B1 | * | 9/2001 | Murakawa | 716/8 |
| 6,516,456 B1 | * | 2/2003 | Garnett et al. | 716/8 |
| 6,718,520 B1 | * | 4/2004 | Merryman et al. | 716/1 |

* cited by examiner

Primary Examiner—Ryan Yang
(74) Attorney, Agent, or Firm—Smith-Hill and Bedell

(57) ABSTRACT

A netlist of a schematic diagram is generated. The netlist indicates the connectivity of components through connection lines. A normal display mode is provided in which at least a portion of the components are presented on the display, and connection lines corresponding to the components are also displayed. A topology display mode is provided in which the components are presented on the display without the connection lines. The user can switch between the topology display mode and the normal display mode while editing the schematic diagram. Automatic pin assignment and routing of the connection lines is performed according to the netlist, and is based upon grouping similarly classified connection lines. An abstract display mode is provided that presents abstract lines for a selected component, with a single abstract line running between two connected components. The abstract display mode is combinable with the topology display mode. Finally, the automatic positioning of components according to predefined topology templates is provided.

35 Claims, 29 Drawing Sheets

AUTOMATIC SCHEMATIC DIAGRAM GENERATION USING TOPOLOGY INFORMATION

BACKGROUND OF INVENTION

1. Field of the Invention

The present invention relates to software graphics editors. More specifically, a method and related system are disclosed that enable a user to generate schematic diagrams.

2. Description of the Prior Art

Schematic diagrams are widely used to illustrate relationships between the parts of a system. Such diagrams include functional block diagrams, flowcharts, logic diagrams, circuit schematics and flow sheets, to name a few, and are broadly characterized in that they contain components that are interconnected by lines. The components are typically geometrical shapes, or standard shapes recognized amongst professions, that symbolically represent physical components or processes in the system. The interconnecting lines indicate relationships (mechanical, electrical, procedural, etc.) between the components so connected. Schematic diagrams are one of the most effective means of conveying broad information about a system, and are thus extremely useful in conveying knowledge. There exists a great deal of software in public use that enables users to design, edit and print schematic diagrams. However, despite the availability of such sophisticated software, the creation of a good schematic diagram continues to require a great deal of time, much of it spent in the tedious editing of the spatial positioning of the components and interconnecting lines.

As a general guideline, a good schematic diagram should: demonstrate the interconnectedness of components, reflect the existence of logical clusters, minimize the number of intersections and jogs in the connection lines, and efficiently utilize the available drawing area. Schematic diagram generation systems must provide a number of editing features that enable a user to create a schematic diagram. At a minimum, the user must be able to specify the positions and sizes of the components, the position of pins on the components, and the routes the connection lines follow between their respective pins. As used here, the term "pin" indicates the end-point or start-point position of a connection line on a component. Each connection line thus has at least two pins. As the number of components and connection lines increase, so too does the difficulty in creating the schematic diagram. Moreover, there are times when a user may want to create two or more schematic diagrams of the same system, with each diagram emphasizing a different aspect of the system. This is termed changing the topology of the schematic diagram, as it involves the spatial reorganization of the components with respect to each other. Changing the topology of an existing diagram is a time-consuming task when using current editor software packages.

As a first step in creating a schematic diagram, the editor software creates a "netlist", which holds information about the positions and sizes of components, and the routing of connection lines between these components. The netlist may be loaded from permanent memory (such as a hard disk, CD, etc.), or it may be created from scratch, and is used by graphics software within the editor to draw the corresponding schematic diagram on a display of the computer. As the user makes changes to the schematic diagram as presented on the display, the editing software makes corresponding changes to the netlist. The netlist is, in effect, the internal representation of the schematic diagram within the memory of the computer. As such, its exact nature is a design choice that will vary from program to program, and it is pointless to go into specific details of its organizational structure. The construction and use of such netlists is well known in the art. Netlists may also be generated automatically by specialized software that parses other higher-language files. Examples of this include the parsing of hardware description language (HDL) files to obtain a netlist for a circuit schematic. After the netlist is loaded into memory, the user is free to change the position of the components, the sizes of sizable components, the positions of floating pins, and the routing of the connection lines. As used here, a "floating pin" is one that is not constrained to a specific position on its component. Please refer to FIG. 1. FIG. 1 is an example schematic diagram 10. The schematic 10 includes six sizable components (PLA, STK, REG, INC, OUT and MUX), and thirteen fixed-sized component 12 for a total of 19 components. Numerous connection lines 14 run between the various components, and are in the form of an arrow to indicate the flow of data between the components. The components may be classed with reference to a connection line 14 as a "source component" or a "load component", the terminology being adopted from the electronics profession. The connection line arrows 14 have their tails anchored on a source component, and their heads pointing to a load component. Depending on the connection lines 14 being considered, the same component may be both a source and a load, as it may both be pointed to by a connection line 14, and point at another component via a connection line 14. A user must spend a fair amount of time to generate the schematic 10, carefully positioning and sizing the components, and routing the connection lines 14. However, the topology of the schematic 14 is based upon an idea or theme that the user is trying to impart. To emphasize or indicate a different idea, the user may wish to change the topology of the schematic 10. FIG. 2 illustrates this concept. FIG. 2 shows the schematic 10 with a different topological layout, thereby presenting a new schematic 20. In many editing packages, changing the schematic 10 to look like the schematic 20 can be almost as time-consuming as making the original schematic 10. For example, some editing software does not explicitly remember the connectivity of the various components. Hence, when a component is moved, such as component PLA, the connection lines 14 associate with the component do not move with the component. Each connection line 14 must therefore be re-routed, and the positions of its pins re-positioned. Other editor packages may keep track of the connectivity of the components, but they generally perform a rather crude auto-routing function that has connection lines 14 crossing over and through components. This is shown in FIG. 3. FIG. 3 is an example schematic with connection lines 14 generated by a simple auto-router. It's clear from FIG. 3 that a user will have to spend a great deal of time "cleaning up" the connection lines 14 generated by the auto-router. Finally, and what is least obvious, is that during the design and construction of a schematic, the user may lose focus of the theme which he or she is trying to convey due to the complexity of the connection lines 14. That is, it is not always a quick and easy task to determine which components are connect to which other components. The very presence of so many connection lines and pins can make simple changes to the topology of the schematic more difficult, as poorly routed connection lines and pins during intermediate stages of the design process can actually obscure the flow of information that is to be conveyed by the schematic diagram. Such obfuscation is also present in FIG. 3.

SUMMARY OF INVENTION

It is therefore a primary objective of this invention to provide an improved display methodology that permits a user to switch between a normal display mode and a topology display mode. In the normal display mode, components and their respective connection lines are displayed, whereas in the topology display mode the components are displayed without their corresponding connection lines.

It is a further objective of the present invention to provide support for the automatic generation of new topologies according to certain predefined topology templates.

It is yet another objective of the present invention to classify and group connection lines according to their driver/load characteristics.

It is another object of the present invention to provide an abstract display mode that is combinable with the topology display mode, and which provides a summary of the connectedness of the various components.

It is yet another objective of the present invention to provide automatic routing of connection lines which is based upon the classification grouping of the connection lines.

Briefly summarized, the preferred embodiment of the present invention discloses a schematic diagram editing method and corresponding computer system. The computer system includes a display and an input device, such as a mouse or a keyboard. The present invention generates a netlist of a schematic diagram. The netlist indicates the connectivity of components through connection lines. A normal display mode is provided in which at least a portion of the components are presented on the display, and connection lines corresponding to the components are also displayed. A topology display mode is provided in which the components are presented on the display without the connection lines. The user can switch between the topology display mode and the normal display mode while editing the schematic diagram. Automatic pin assignment and routing of the connection lines is performed according to the netlist, and is based upon grouping similarly classified connection lines. An abstract display mode is provided that presents abstract lines for a selected component, with a single abstract line running between two connected components. The abstract display mode is combinable with the topology display mode. Finally, the automatic positioning of components according to predefined topology templates is provided.

It is an advantage of the present invention that by enabling a user to alternate between the normal display mode and the topology display mode, the user is able to remove the distraction of connection lines at will so as to obtain a better comprehension of the topology of the schematic diagram. Further, with the addition of the abstract view superimposed upon the topology display mode, the user can quickly ascertain the connectivity of a specific component with other components by way of a minimum number of indicating lines. Classifying and grouping connection lines by their driver/load characteristics enables the abstract view to provide summarized information of the total connectivity of a selected device. Further, with an intelligent auto-router, routing a group of similar connection lines, as determined by their related classifications, leads to a more aesthetically pleasing and comprehensible schematic, which is performed automatically for the user. Finally, by providing predefined topology templates, a user can quickly and automatically organize components based upon a desired characteristic that interrelates the various components.

These and other objectives of the present invention will no doubt become obvious to those of ordinary skill in the art after reading the following detailed description of the preferred embodiment, which is illustrated in the various figures and drawings.

DETAILED DESCRIPTION

Figure 4:
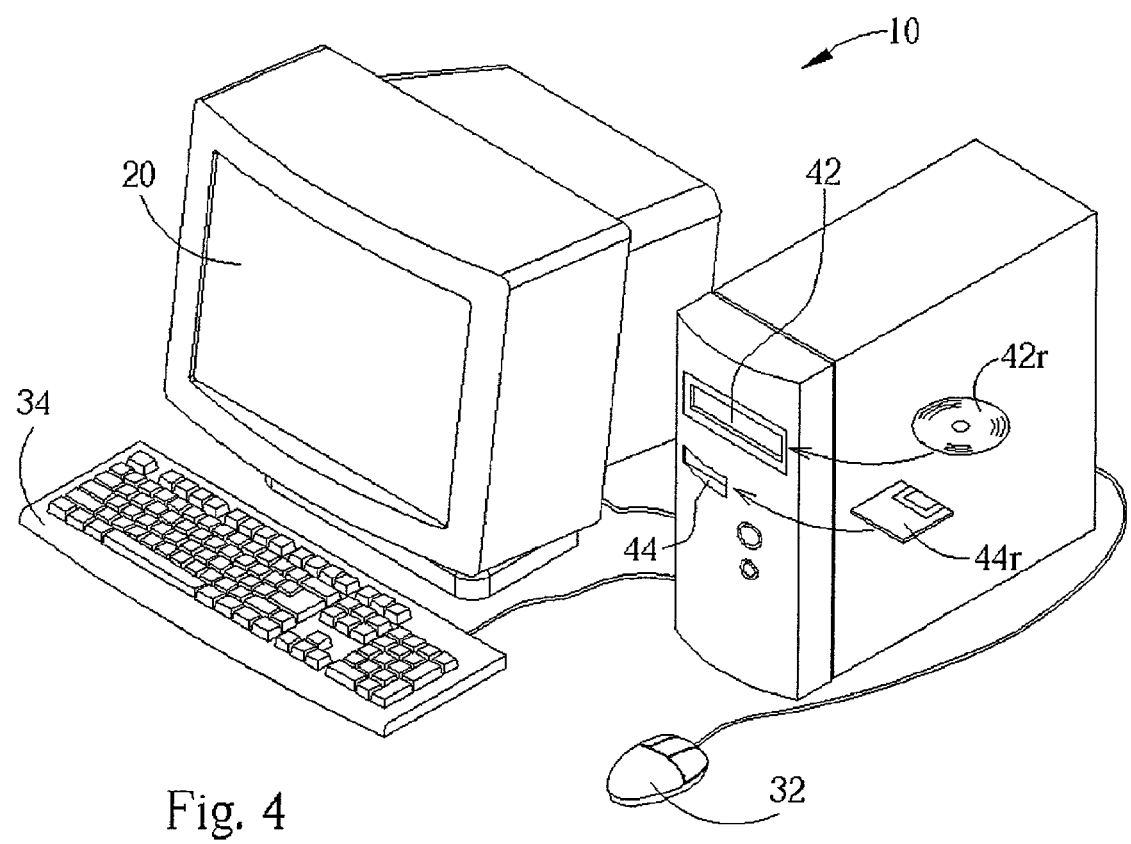
FIG. 4 is a simple perspective view of a computer system according to the present invention.
Figure 5:
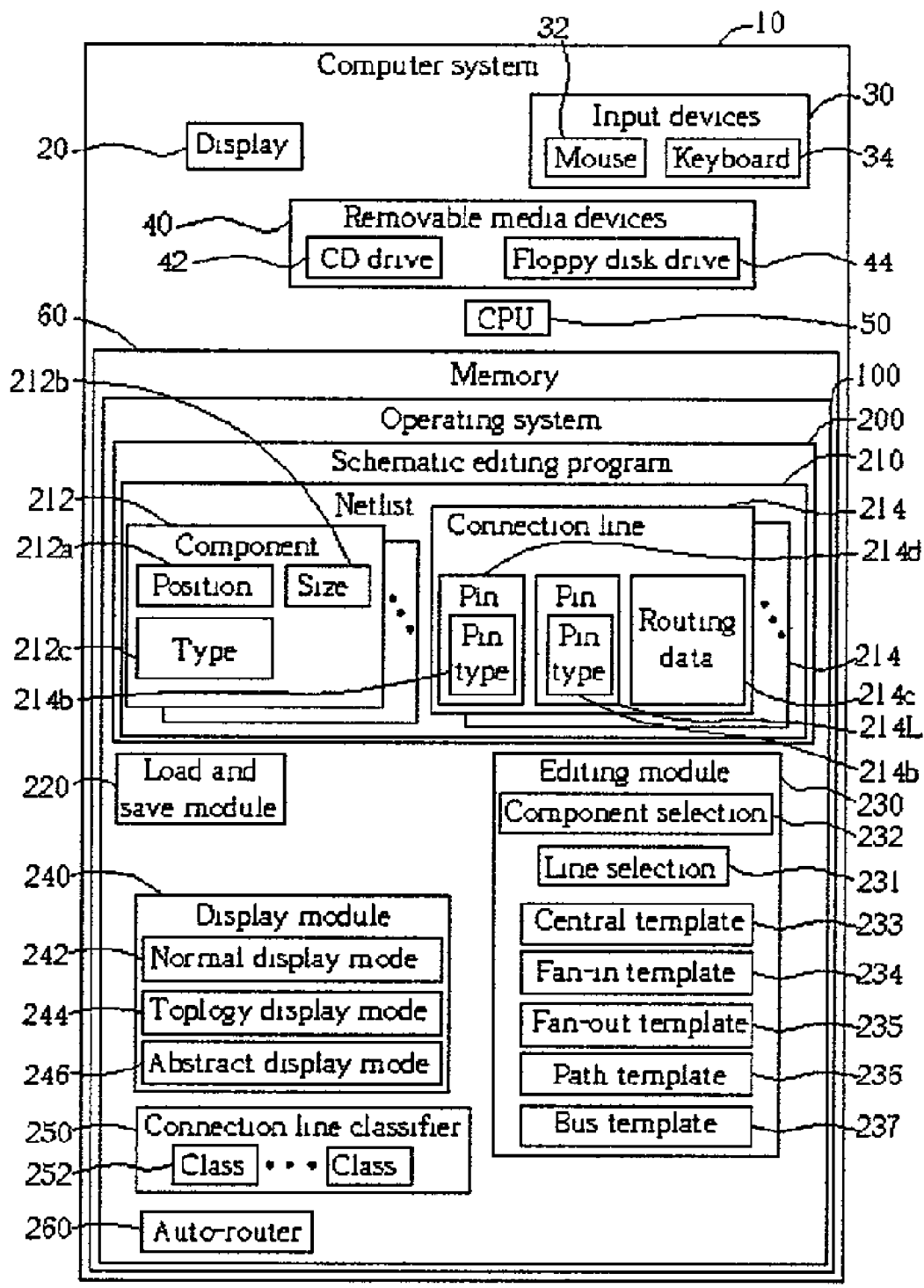
FIG. 5 is a block view of the computer system of FIG. 4.

Please refer to FIG. 4 and FIG. 5. FIG. 4 is a simple perspective view of a computer system 10 according to the preferred embodiment of the present invention. FIG. 5 is a block view of the computer system 10. The computer system 10 is a standard computing platform, but is programmed to implement the present invention method. The computer system 10 includes a display 20 that is used to provide visual data to a user, input devices 30 that enable the user to control the computer system 10, removable media devices 40, a central processing unit (CPU) 50, and memory 60. The input devices 30 typically include a mouse 32 and a keyboard 34, though other suitable devices are certainly possible (touch screen displays, light pens, etc.). The memory 60 is typically virtual memory as provided by an operating system 100, in a manner will known to those in the art, and under which various applications run. As such, the memory 60 may include both volatile memory such as RAM, DRAM, SDRAM, etc., and non-volatile memory such as a hard disk. The CPU 50 executes programs in memory under control of the operating system 100. Those skilled in the art of computer programming will recognize that the operating system 100 is assumed present in the preferred embodiment, as writing applications under operating systems is generally easier than writing a fully self-supporting application. Nevertheless, the operating system 100 is not strictly necessary. In a standard manner, the operating system 100 provides broad support that enables applications to obtain input from the input devices 30, read data from the removable media devices 40, and control the contents presented on the display 20. The removable media devices 40 may include a CD drive 42 for reading a CD-ROM 42r, a floppy disk drive 44 for reading a floppy disk 44r, or other similar devices. A schematic editing program 200, executable by the CPU 50, is provided in the memory 60, running under the operating system 100. The schematic editing program 200 is designed to implement the features and methods of the present invention, and its design should be clear to a computer programmer of average skill in the art after reading the following disclosure. Initially, a floppy disk 44r, a CD-ROM 42r or any other similar removable media is provided to one of the appropriate removable media devices 40, and an installation procedure is performed that utilizes data read from the removable media 42r, 44r to provide the schematic editing program 200 in the memory 60. Such installation procedures are well known in the art, and it should be clear that the removable media 42r, 44r need not contain an exact duplicate of the schematic editing program 200 as it resides in the memory 60, but rather data sufficient to generate the schematic editing program 200. For example, the data on the removable media 42r, 44r may be scrambled to prevent unauthorized installation of the schematic editing program 200.

The present invention schematic editing program 200 allocates memory 60 for a netlist 210. The netlist 200 holds an internal representation of a schematic diagram that can be parsed and modified by the schematic editing program 200. In particular, the netlist 210 contains data about the position 212a, size 212b and type 212c of a plurality of components 212, and the pins 214D, 214L; pin type 214b and routing data 214c of a plurality of connection lines 214. The type 212c of a component 212 will typically indicate the visible characteristics (i.e., a box, an OR gate, a conditional statement diamond, etc., whether or not the component is sizable, rotatable, etc.) of the component 212. Pins types 214b can include floating type pins 214D, 214L, or fixed pins 214D, 214L. With floating type pins 214D, 214L, the position of the pin 214D, 214L may be placed anywhere along the perimeter of its corresponding component 212. Fixed pins 214D, 214L are constrained to a specific position on the corresponding component 212 (for example, in a symbol for a logic gate, such as an AND gate, the corresponding pins 214D, 214L would be of a fixed pin type 214b). To ease auto-routing considerations, pins 214D, 214L are typically floating, if possible. Textual data for labeling purposes can be associated with each component 212 and connection line 214, and is recorded by the netlist 210. As a basic characteristic, the netlist 210 records the relative connectivity of components 212 by way of the connection lines 214. That is, the connectivity of one component 212 with another component 212 is recorded within the netlist 210, and results in a corresponding connection line 214. Exactly how this connectivity is internally indicated within the netlist 210 is a design choice for the programmer, and may involve nothing more than appropriate parsing of the connection lines 214. A load and save module 220 enables a netlist 210 to be loaded from an external source (such as a hard disk, from the removable media devices 40, etc.), and to save a netlist 210 to such an external source. Further, as in the prior art, the load and save module 220 is capable of constructing a suitable netlist 210 from a higher-level language, such as HDL source code. Additionally, a netlist 210 may be made from scratch by way of an editing module 230. The editing module 230 enables a user to modify the netlist 210, or to create a completely new netlist 210. The editing module 230 enables the user, by way of the input devices 30, to add, delete and modify components 212 and connection lines 214.

The editing module 230 works in conjunction with a display module 240 to enable a user to view a schematic on the display 20 while editing that schematic. The schematic presented on the display 20 by the display module 240 is drawn according to the netlist 210. Using common graphics editing techniques, the user makes changes to the schematic presented on the display 20, and the editing module 230 makes corresponding changes to the netlist 210. The display module 240, in a continuous fashion, continues to update the display 20 as these editing steps are being performed, so that the operation appears to the user to perform in a smoothly animated manner. These graphical editing techniques, and the manner in which they utilize the input devices 30, are well known in the art and do not need to be expounded upon here.

The display module 240 of the present invention supports three display modes, two of which are unique to the present invention. These display modes include a normal display mode 242, a topology display mode 244, and an abstract display mode 246. Using the input devices 30, the user may select one of the display modes 242, 244 or 246 to utilize while editing. The display module 240 then uses the particular user-selected display mode 242, 244, 246 when interfacing with the editing module 230 to enable the user to view and edit a schematic (as defined by the netlist 210) on the display 20.

Figure 6:
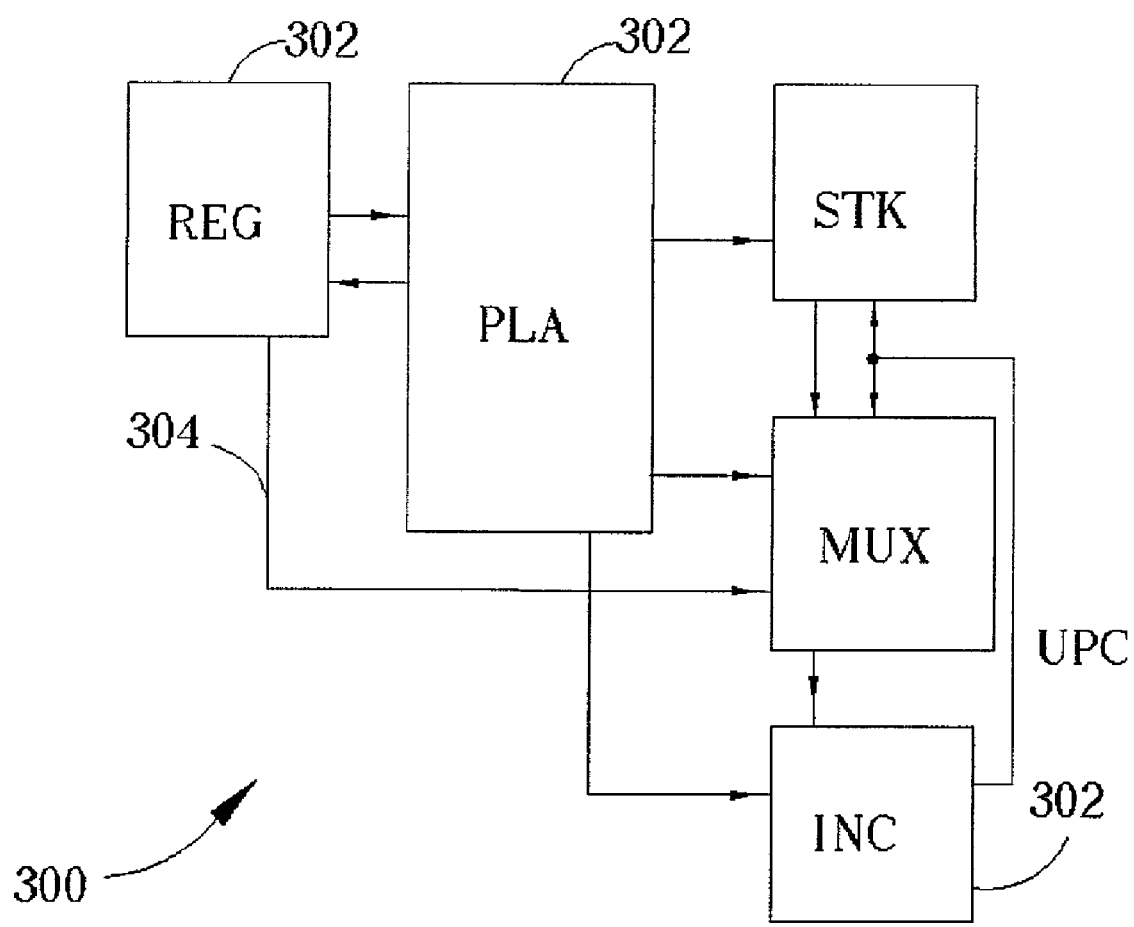
FIG. 6 is an example schematic as presented on a display by a display module of the present invention when using a normal display mode and a corresponding example netlist.

Please refer to FIG. 6. FIG. 6 is an example schematic 300 as presented on the display 20 by the display module 240 when using the normal display mode 242 and a corresponding example netlist 210. As shown in FIG. 6, the example netlist 210 is relatively small, having only five components 212 presented as five corresponding boxes 302. Connection lines 214 in the netlist 210 are presented as arrows 304 on the display 20. The direction of the arrows 304 indicates the driver/load arrangement of the corresponding connection lines 214. Of course, it should be clear that not all five components 212 and corresponding connection lines 214 need be present at once on the display 20 as boxes 302 and arrows 304. Panning and zooming operations of the user may cause some of the components 212 and corresponding connection lines 214 to move out of the viewable range of the display 20, and hence only a portion of the components 212 and connection lines 214 of the netlist 210 may be visible on the display 20 at once. Such characteristics of all graphical editors are common knowledge in the art. The normal display mode 242 is analogous to those display modes found in the prior art, and it enables the user to edit the schematic 300 while viewing both the components 212 and the corresponding connection lines 214. Additionally, any textual information associated with a component 212 or a connection line 214 is optionally displayed so as to permit clear labeling of each corresponding box 302 and arrow 304. Although in the following only boxes 302 and arrows 304 are shown as being displayed on the display 20, it should be understood that all of the display modes 242, 244 and 246 support a wide variety of symbols that may be incorporated within a schematic diagram, with shapes corresponding to the corresponding type 212c of the component 212.

Figure 7:
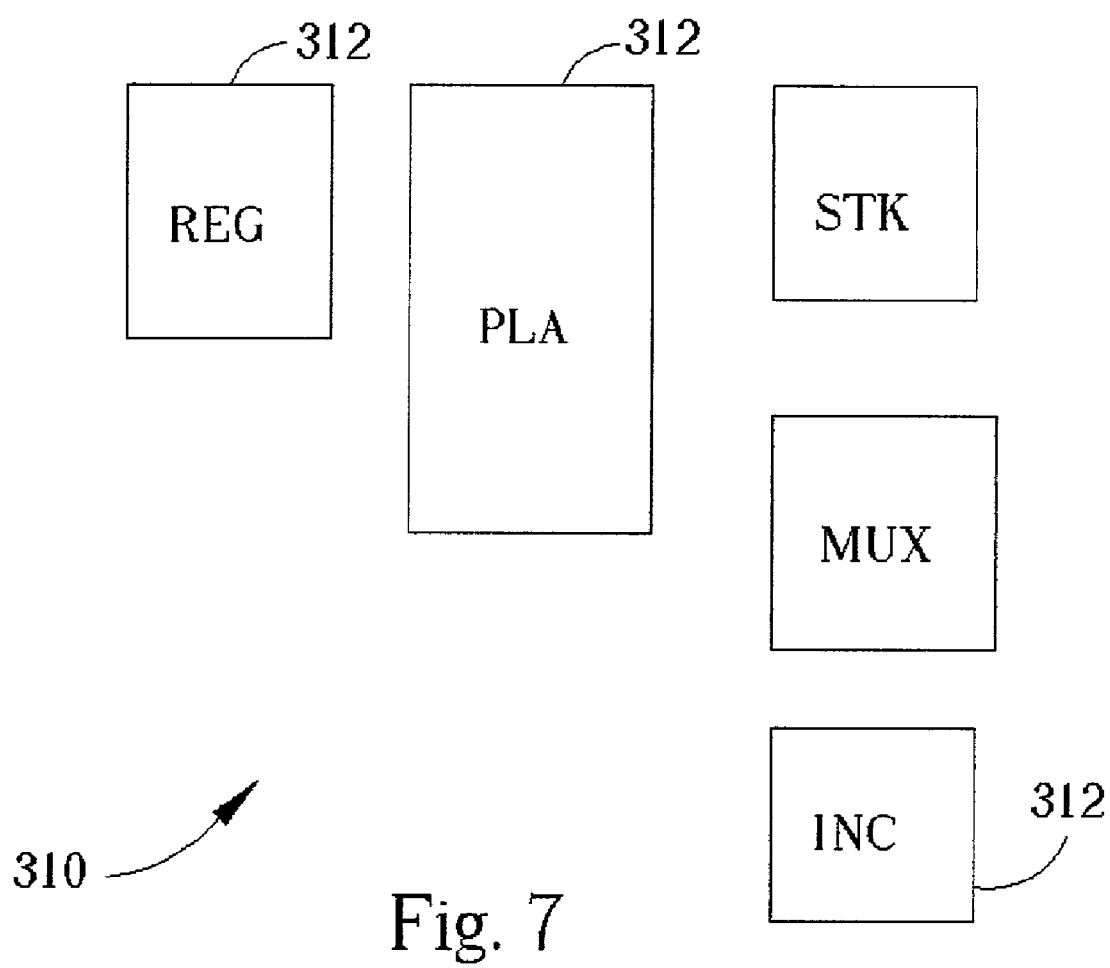
FIG. 7 is an example schematic as presented on a display by a display module of the present invention when using a topology display mode and a corresponding example netlist as presented in FIG. 6.

Please refer to FIG. 7. FIG. 7 is an example schematic 310 as presented on the display 20 by the display module 240 when using the topology display mode 244 and the corresponding example netlist 210 as presented in FIG. 6. The schematic editing program 200 permits the user to switch at will between the normal display mode 242 and the topology display mode 244. The method used to enable the user to switch between the various display modes 242, 244 and 246 is a design choice for the user interface of the schematic editing program 200, and will typically involve appropriate manipulation of the input devices 30 on the part of the user. As shown in FIG. 7, the example netlist 210 is presented by the topology display mode 244 with only the components 212 displayed, with text associated with each component 212 also being optionally displayed. The topology display mode 244 is characterized in that no connection lines 214 are displayed. Further, pins 214D, 214L are also not displayed. Hence, when in topology display mode 244, the viewable portion of a netlist 210 is displayed in such a manner that only the graphical symbols relating to the components 212 are presented on the display 20. In FIG. 7, this is the boxes 312 and any associated text. The connection lines 214 are not displayed when in topology display mode 244, nor is any information related to the connection lines 214 displayed (such as textual information). While in the topology display mode 244, the display module 240 continues to interface with the editing module 230 to enable the user to add, delete and modify the components 212. Hence, the user can still change the relative positions 212a of the components 212 (e.g., by dragging and dropping their associated boxes 312), and similarly change the size 212b and type 212c of the components 212. The only limit is that the smallest size of a resizable component 212 is limited by the number of pins 214D, 214L associated with the component 212. The primary difference of the topology display mode 244 over the normal display mode 242 is that the user is free to edit the position, size and type of the components 212 without being distracted by the clutter that is presented by the connection lines 214 and pins 214L, 214D. The user is thus better able to analyze the overall topology of the components 212.

The schematic editing program 200 includes a connection line classifier 250. The connection line classifier 250 analyzes the netlist 210 to determine the related connectivity of the various components 212. As each connection between components 212 corresponds to a connection line 214, the connection line classifier 250 in effect classifies the various connection lines 214 based upon their connections to the various components 212. This classification is based upon the driver/load characteristic of the connection line 214. In general, each connection line 214 has one driver pin 214D that is the location of the "tail" of the connection line 214, and one or more load pins 214L that are the location of the "head" or "heads" of the connection line 214. For the sake of simplicity, only one load pin 214L is indicated for each connection line 214, but it should be understood that the general case permits a plurality of load pins 214L for each connection line 214. The component 212 with which the driver pin 214D is associated is considered the driver component 212 for the connection line 214. Similarly, the component 212 with which the load pin 214L is associated is termed the load component 212 of the connection line 214. Each connection line 214 thus has a driver/load characteristic that is given by the driver component 212 and the load component 212 of the connection line 214. Connection lines 214 having the same driver/load characteristic are grouped together by the connection line classifier 250 into the same class 252. These classes are utilized by the abstract display mode 246.

Figure 1:
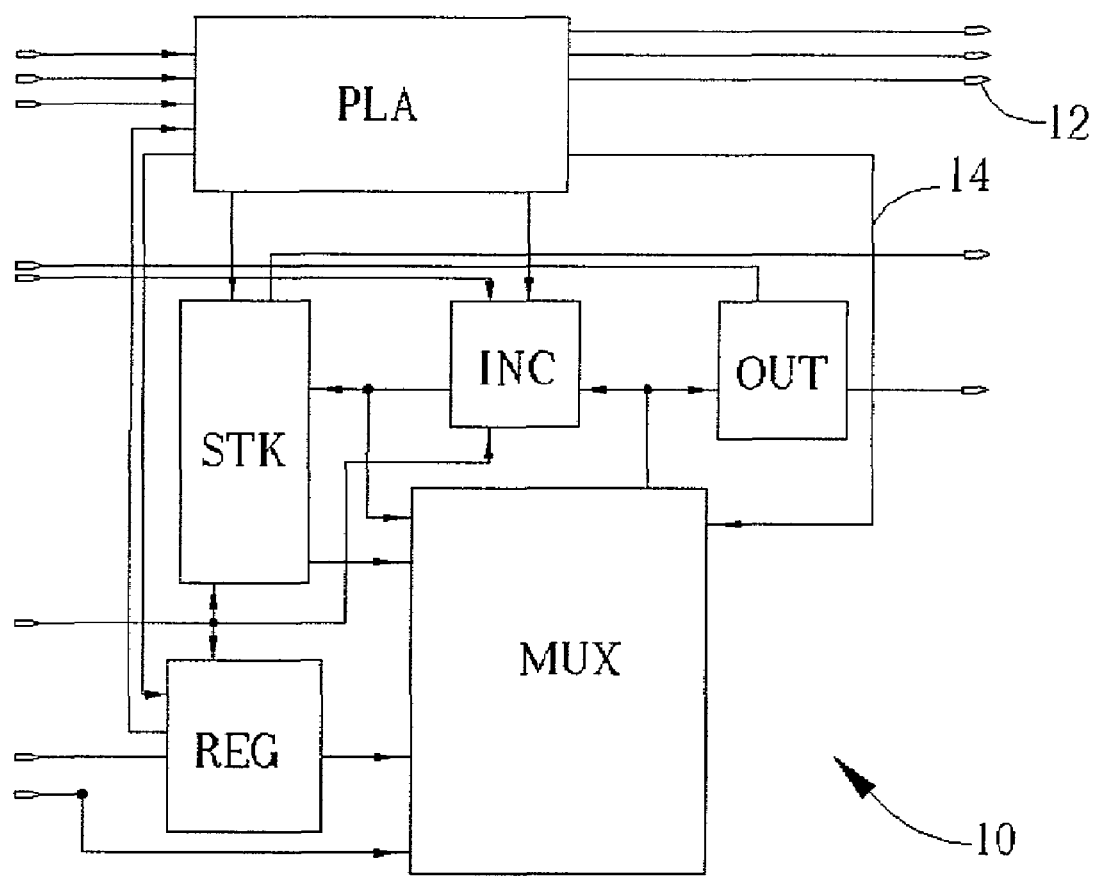
FIG. 1 is an example schematic diagram.
Figure 2:
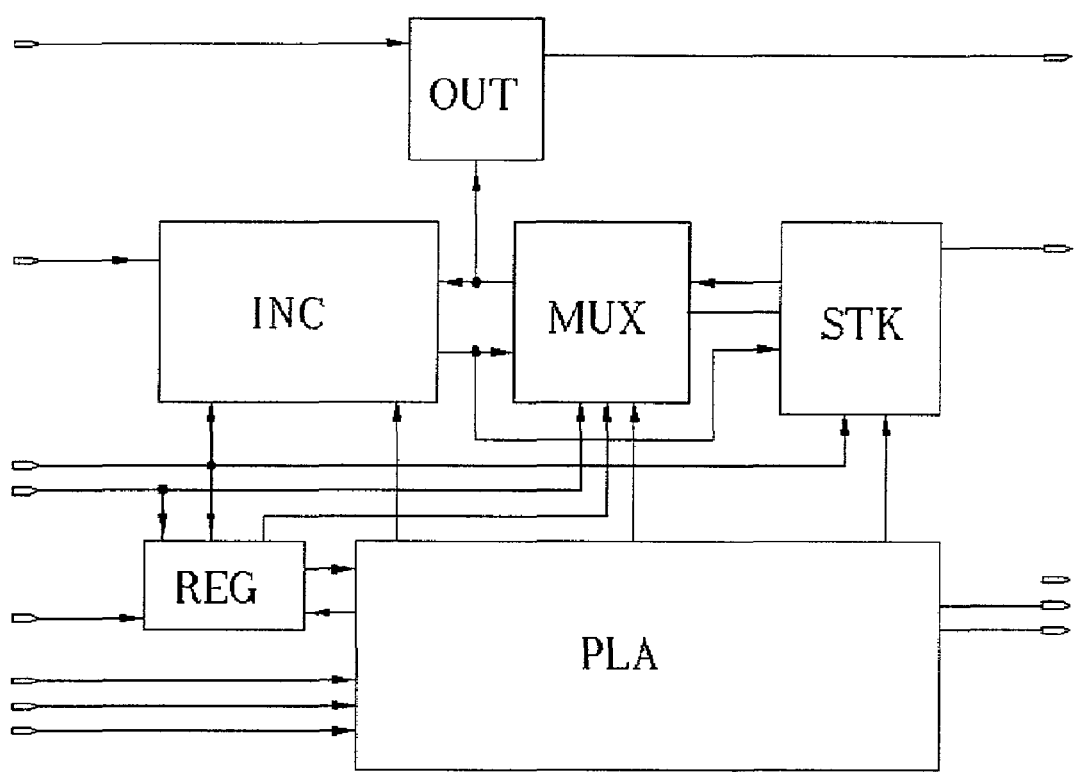
FIG. 2 shows the schematic of FIG. 1 with a different topological layout.
Figure 3:
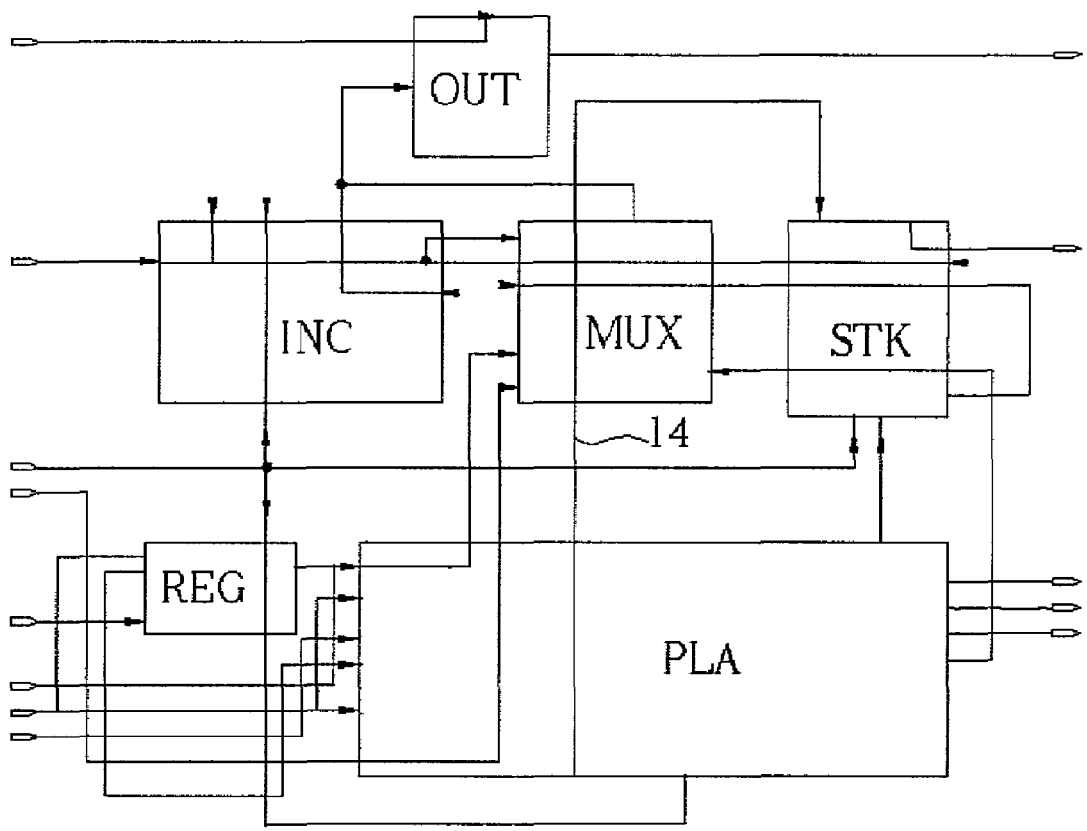
FIG. 3 is an example schematic with connection lines generated by a simple auto-router.
Figure 8:
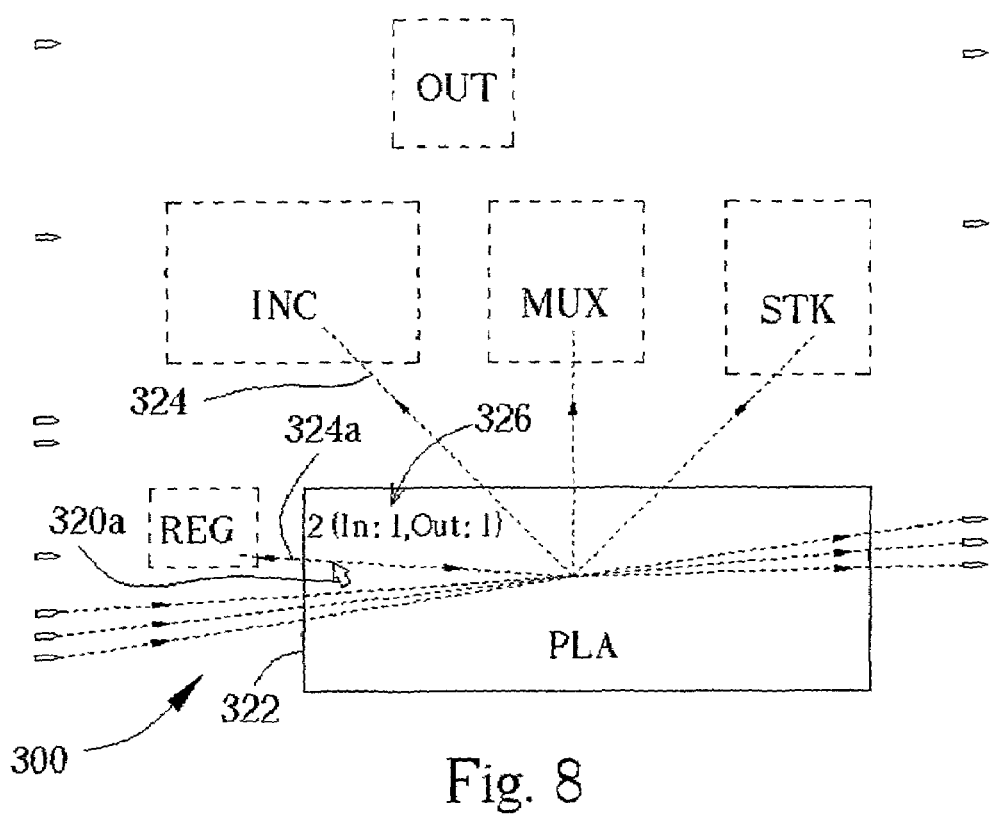
FIG. 8 is an example schematic as presented on a display by a display module of the present invention when using an abstract display mode and an example netlist corresponding to the schematic of FIG. 2.

Please refer to FIG. 8 with reference to FIG. 2 and FIG. 5. FIG. 8 is an example schematic 320 as presented on the display 20 by the display module 240 when using the abstract display mode 246 and an example netlist 210 corresponding to the schematic of FIG. 2. The schematic as presented in FIG. 2 would correspond to the normal display mode 242 for the example netlist 210. As with the topology display mode 244, the user is free to switch into the abstract display mode 246. The abstract display mode 246 is preferably combined with the topology display mode 244, though it is certainly possible to also combine the abstract display mode 246 with the normal display mode 242. In the preferred embodiment, the user originates in the topology display mode 244 and enters into the abstract display mode 246 by selecting a component 212. The editing module 230 provides a component selection function 232, which is commonly known in the art, and which permits the user (by way of the input devices 30) to select a particular component 212, thus termed a "selected component" 212. Typically, a selected component 212 is drawn on the display 20 in a special color by the display module 240 to indicate the special status of the component 212 as "selected". As shown in FIG. 8, box 322 represents a selected component 212. When in the topology display mode 244, by selecting a component 212, the user may optionally indicate an automatic transition into the abstract display mode 246. That is, the user need not always enter into the abstract display mode 246 when a component 212 is selected, but rather may do so only if particularly indicated by a program setting, or by a special operation with the input devices 30. Such considerations are ones merely of design choice for the user interface of the schematic editing program 200. In any case, when in the abstract display mode 246, a selected component 212 exists, and is drawn accordingly. The display module 240 then parses the classes 252, finding any that relate to the selected component 212. In particular, classes 252 that have the selected component 212 as a driver component 212 or a load component 212 are considered related. For each class 252 that relates to the selected component 212, the abstract display mode 246 draws a single abstract line 324 on the display 20 from the load component 212 to the driver component 212 of the class 252. Each abstract line 324 thus represents a summary of the connectivity of the selected component 212 with other components 212. The abstract lines 324 are drawn as arrows to indicate the driver/load characteristic of each associated class 252, and a single abstract line 324 can have two arrow heads to indicate two classes 252 that are identical but for a flipped relationship in their driver/load characteristic. Such an arrangement is depicted by abstract line 324a. By comparing the abstract display mode 246 for a netlist 210 as presented in FIG. 8 with the corresponding normal display mode 242 as presented in FIG. 2, it is clear that the present invention abstract display mode 246 offers the user an extremely quick manner in which to determine the connectivity of a selected component 212. Of course, it is possible to combine the abstract display mode 246 with the normal display mode 242, so that abstract lines 324 are presented on top of a display as presented by the normal display mode 242. Finally, while in the abstract display mode 246, each abstract line 324 may be provided with abstract information 326. This abstract information 326 may be drawn when the abstract line 324 is drawn (in which case each abstract line 324 will have corresponding abstract information 326), or may be drawn in response to the input devices 30. For example, when a cursor is moved close to an abstract line 324 by way of the mouse 32, a small informative window may pop up near the abstract line 324 to provide the abstract information 326. The abstract information 326 will typically indicate how many load and driver connection lines 214 are represented by the abstract line 324, the total number of connection lines 214 represented by the abstract line 326, or both. As shown by the abstract information 326 in FIG. 8, abstract line 324a represents two connection lines 214: one a load line 214 going to a component 212 labeled REG, and the other a driver line 214 coming from the REG component 212. The abstract information 326 is drawn in response to a cursor 320a being brought into proximity with the abstract line 324a.

The present invention provides the user with a variety of topology template functions that automatically change the topology of a schematic, with corresponding changes being applied to the netlist 210, according to the inherent connectivity of the components 212. These predefined template functions are outlined below. The manner used to enable the user to invoke the predefined template functions is, again, a design choice for the user interface of the schematic editing program 200, and will typically involve the input devices 30 (such as pressing a key on the keyboard 34, or using the mouse 32 to click on a button on the display 20, etc.). The predefined template functions include:

1. Central Template 233

The user selects a component 212 by way of the component selection function 232, and then invokes this central template function 233. The central template function 233 modifies the netlist 210 to place the user-selected component 212 at a central position of the schematic diagram, and then arrays the other components 212 around the user-selected component 212. Components 212 that have a stronger connectivity relationship with the user-selected component 212 are placed closer to the user-selected component 212. The relative distance between two non-user-selected components 212 is also based upon the connectivity relationship between the two components 212. The components 212 should not overlap each other.

2. Fan-In Template 234

The user selects a component 212 by way of the component selection function 232, and then invokes this fan-in template function 234. The fan-in template function 234 modifies the netlist 210 to place the user-selected component 212 at a rightmost position of the schematic diagram with respect to the other components 212, and then arrays the other components 212 to the left of the user-selected component 212. Components 212 that have a stronger connectivity relationship with the user-selected component 212 are placed closer to the user-selected component 212. The relative distance between two non-user-selected components 212 is also based upon the connectivity relationship between the two components 212.

3. Fan-Out Template 235

The user selects a component 212 by way of the component selection function 232, and then invokes this fan-out template function 235. The fan-out template function 235 modifies the netlist 210 to place the user-selected component 212 at a leftmost position of the schematic diagram with respect to the other components 212, and then arrays the other components 212 to the right of the user-selected component 212. Components 212 that have a stronger connectivity relationship with the user-selected component 212 are placed closer to the user-selected component 212. The relative distance between two non-user-selected components 212 is also based upon the connectivity relationship between the two components 212.

4. Path Template 236

The user selects multiple components 212 by way of the component selection function 232 to define path components 212, and then invokes this path template function 236. The path template function 236 modifies the netlist 210 to place the path components 212 in a row within the schematic diagram with respect to each other, and centrally with respect to the other components 212. The path template function 236 then modifies the netlist 210 to place the other components 212 around the path components 212 according to their related connectivity.

5. Bus Template 237

The user selects a connection line 214 by way of a line selection function 231 to define a bus line 214, and then invokes this bus template function 237. The line selection function 231 is analogous to the component selection function 232, and enables the user to select a particular connection line 214 by way of the input devices 30. The bus template function 237 modifies the netlist 210 to place components 212 related to the bus line 214 into two rows that run along the bus line 214, with the bus line 214 located centrally with respect to all of the components 212. Components 212 related to the bus line 214 are those components 212 that are directly connected to the bus line 214. The bus template function 237 then modifies the netlist 210 to place the other components 212 that are not related to the bus line 214 around the components 212 that are related to the bus line 214 according to their connectivity relationships.

Figure 9:
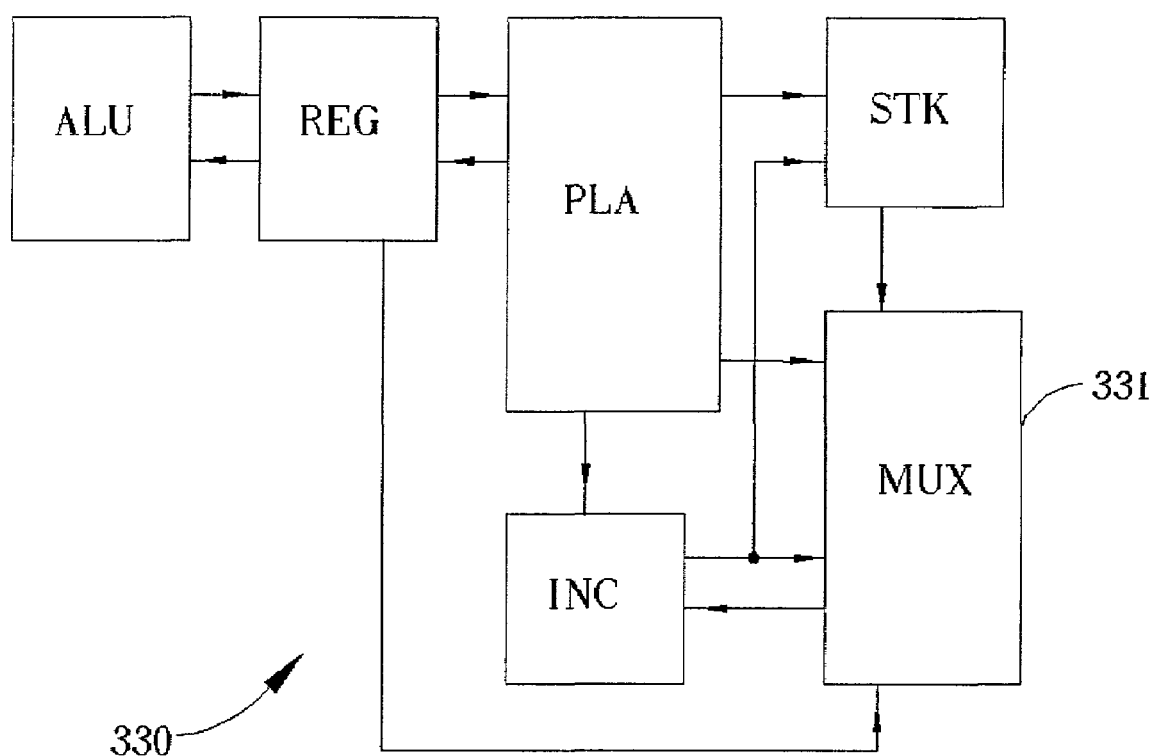
FIG. 9 shows a schematic as presented on a display by a present invention display module for an example netlist when the display module is in a normal display mode.
Figure 10:
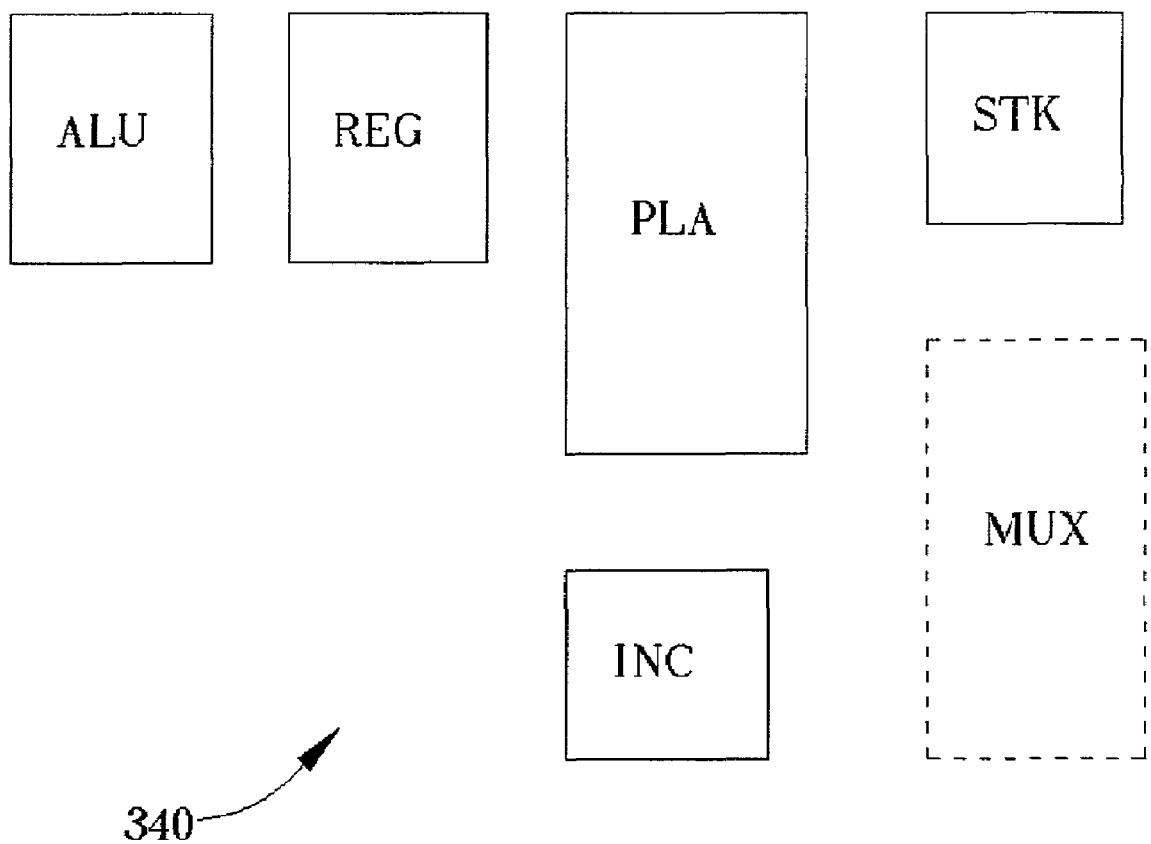
FIG. 10 shows a schematic as presented on a display by a present invention display module for the example netlist used in FIG. 9 when the display module is in a topology display mode.
Figure 11:
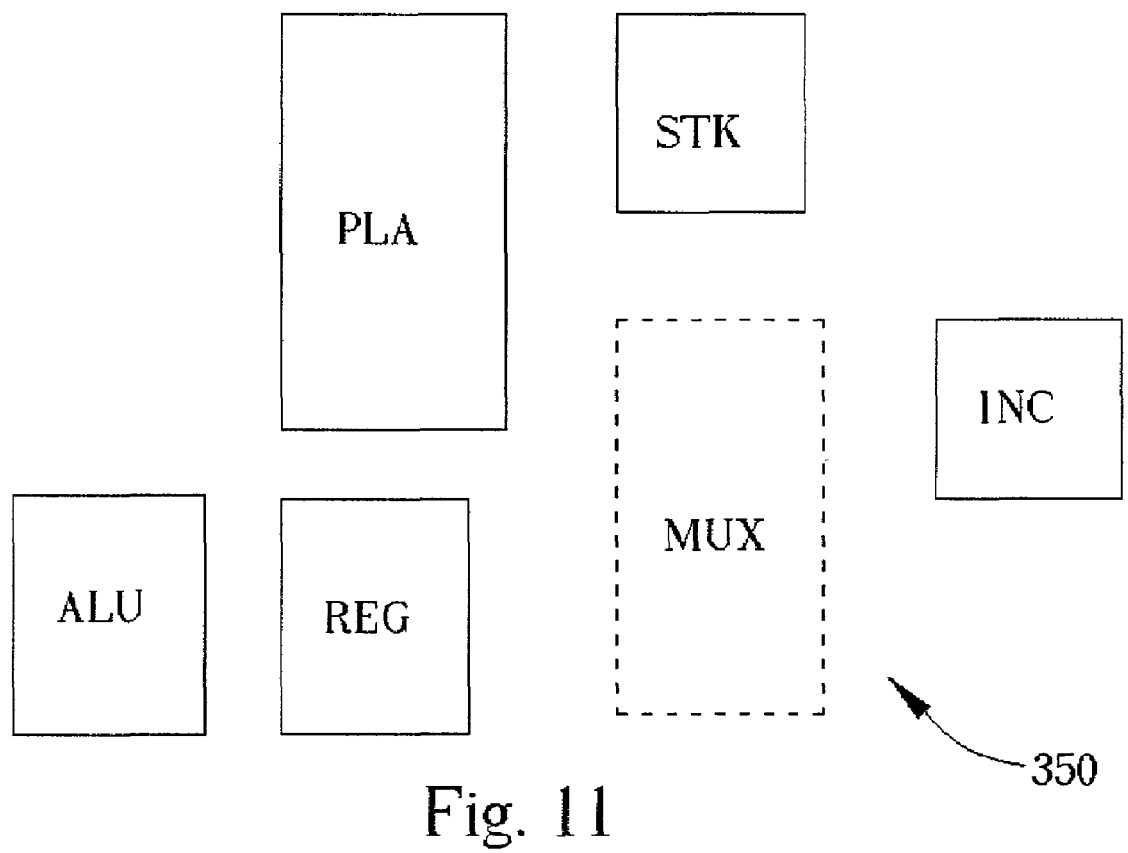
FIG. 11 illustrates a new topology automatically generated for the schematic of FIG. 10 by a present invention central template function, as presented by a present invention topology display mode.

Examples of using the present invention display module 240 and automatic template functions 233 to 237 of the present invention shall be presented in the following. Please refer to FIGS. 9–11. FIG. 9 shows a schematic 330 as presented on the display 20 by the display module 240 for an example netlist 210, when the display module 240 is in the normal display mode 242. The user wishes to arrange the topology of the schematic 330 so that a component 212 label "MUX", as represented on the display by box 331, is centrally located within the schematic 330. FIG. 10 shows a schematic 340 as presented on the display 20 by the display module 240 for the netlist 210 used in FIG. 9, when the display module 240 is in the topology display mode 244. The user is free to edit the schematic 340 without the distraction or clutter of the connection lines 214. The user, byway of the component selection function 232, selects the component 212 labeled "MUX", and which is thus rendered as a selected component 212 by the topology display mode 244, as indicated by box 341 being drawn with a dotted line. As shown in FIG. 11, the user invokes the central template function 233 to automatically generate a schematic 350 having a new topology. The selected component 212 labeled "MUX" is placed in a central position of the schematic 350, with the other components 212 arrayed around the selected component 212. The degree of connectivity of the other components 212 with the selected component 212 is indicated by the relative distance of the other components 212 from the selected component 212. Further, the relative connectivity of the other components 212 is indicated by their distances from each other. Hence, a component 212 labeled "ALU" is placed adjacent to a component 212 labeled "REG", but farther from the selected component 212 labeled "MUX".

Figure 12:
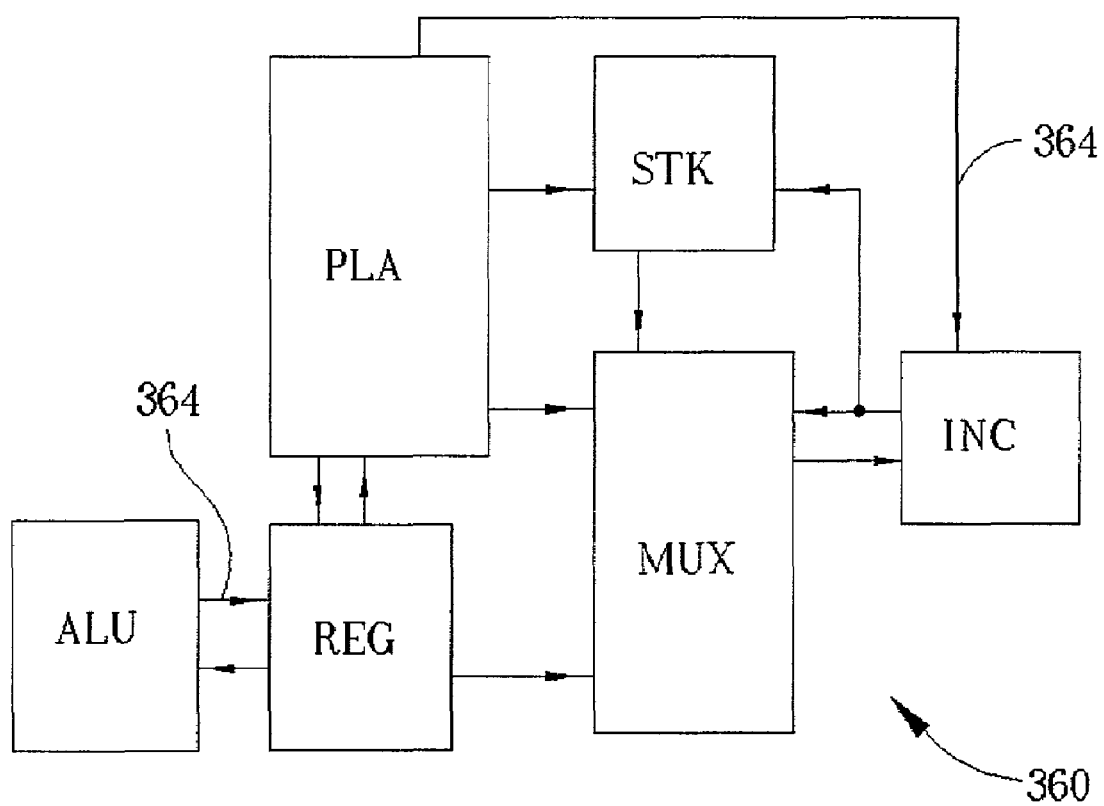
FIG. 12 illustrates a complete schematic of FIG. 11 as presented by a present invention normal display mode.

The schematic editing program 200 includes an auto-router 260 that provides for the automatic routing of the connection lines 214, and automatic positioning (so-called pin assignment) of the pins 214L and 214D on their respective components 212. Whenever the user switches back to the normal display mode 242, prior to calling the normal display mode 242 the schematic editing program 200 invokes the auto-router 260 if any changes have been made to the netlist 210 that would require re-routing of the connection lines 214. Such changes include additions and deletions of components 212, and changing of the positions 212a, size 212b or type 212c of a component 212. The auto-router 260 provides the routing data 214c for each respective connection line 214, and performs the routing in an intelligent manner so as to avoid the connection lines 214 from crossing over components 212, and to minimize the number of jags in the connection lines 214. Pin assignment of the pins 214L and 214D is thus performed in a manner that will best ensure these qualities of the connection lines 214. The auto-router 260 will be discussed in more detail later. As shown in FIG. 12, the user can switch back to the normal display mode 242 to see a complete schematic 360 of the netlist 210 as generated in FIG. 11. Prior to switching into the normal display mode 242, the auto-router 260 re-routes the connection lines 214, as represented by arrows 364, to accommodate the changed positions 212a of the components 212. The complete operation, as required by a user, to centrally position the component 212 labeled "MUX" is thus quick and easy, involving little more than a few user interface operations to select a component 212 and to invoke the central template function 233.

Figure 13:
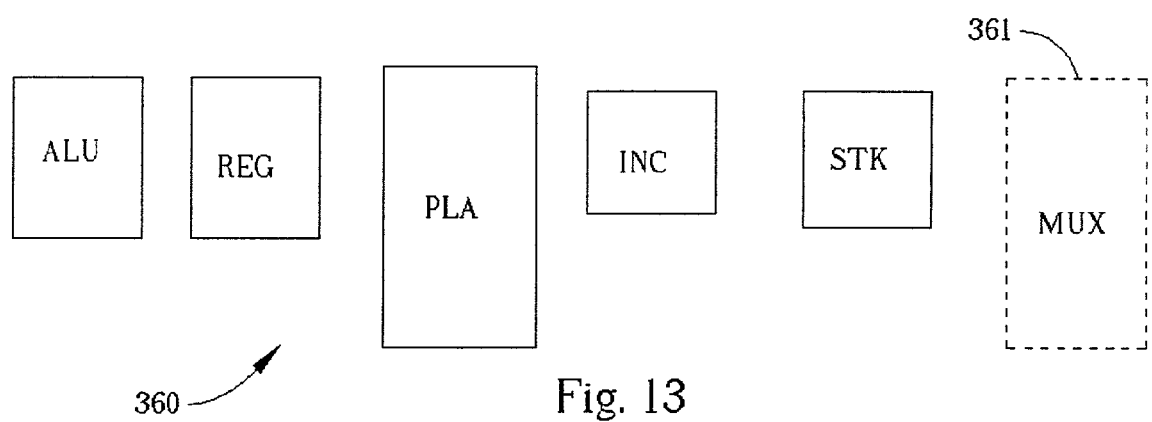
FIG. 13 illustrates a schematic presented under a topology display mode of the present invention generated by a fan-in template function of the present invention.
Figure 14:
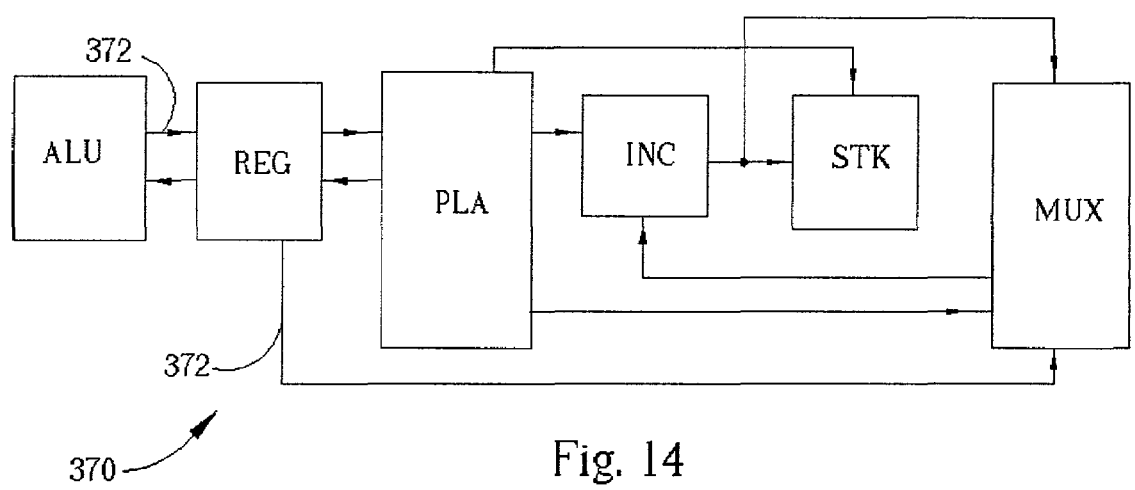
FIG. 14 illustrates a netlist as generated in FIG. 14 being displayed under a normal display mode of the present invention.

Please refer to FIGS. 13 and 14, with reference to FIGS. 11 and 5. The example netlist 210 of FIG. 11 is assumed, generating the corresponding schematic 350 while in the topology display mode 244. Again, the user selects a component 212 labeled "MUX" by way of the component selection function 232, and then invokes the fan-in template function 234. A new schematic 360 is generated, as shown in FIG. 13. The fan-in template function 234 modifies the netlist 210 so that the selected component 212 is placed at a right-most position in the schematic 360, and the remaining components 212 are positioned to the left of the select component 212 (labeled "MUX" as dotted box 361). The relative connectivity of the components 212 is indicated by their placement. Components 212 that are strongly connected are more closely positioned with respect to each other, with the primary connectivity consideration being given to the selected component 212. The component 212 labeled "ALU" is thus farthest to the left of the selected component 212 labeled "MUX", and positioned closely to the component 212 labeled "REG". FIG. 14 illustrates the netlist 210 as generated in FIG. 13 viewed under the normal display mode 242 to present a schematic 370. Connection lines 214, as represented by arrows 372, have been auto-routed by the auto-router 260 just prior to switching into the normal display mode 242.

Figure 15:
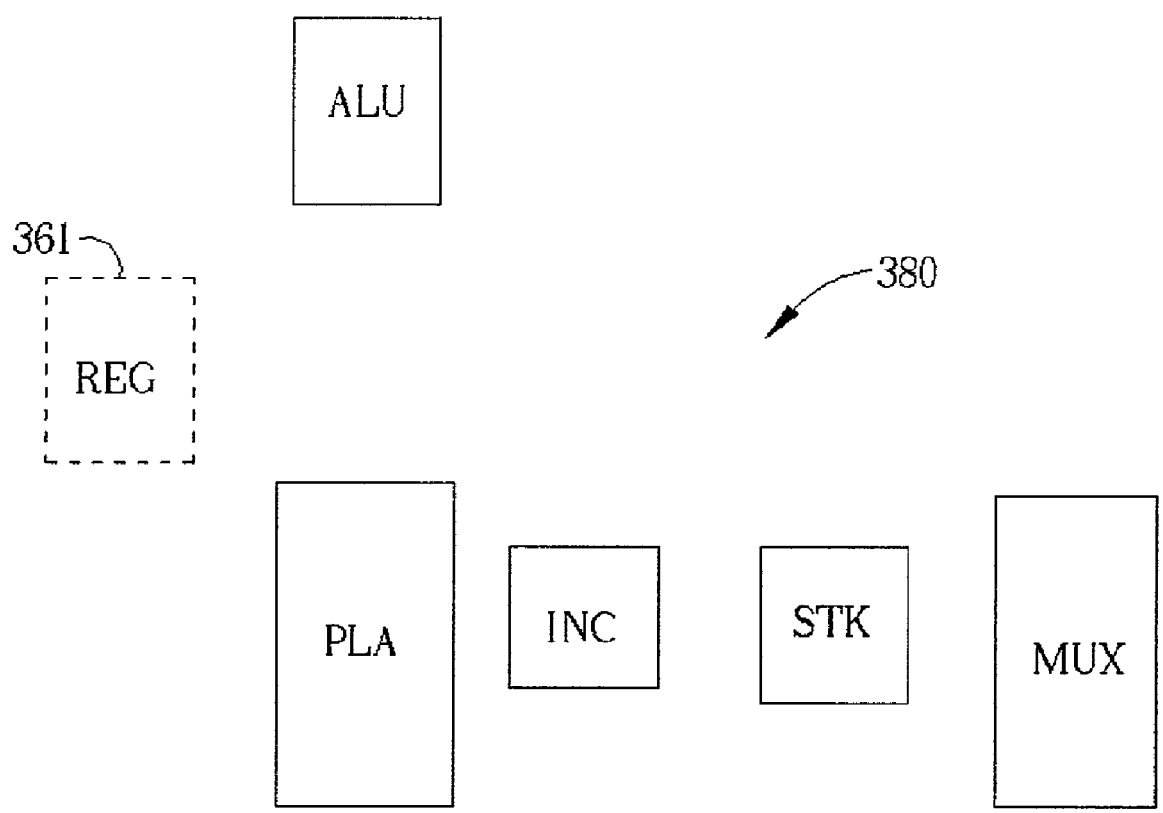
FIG. 15 illustrates a schematic presented under a topology display mode of the present invention generated by a fan-out template function of the present invention.
Figure 16:
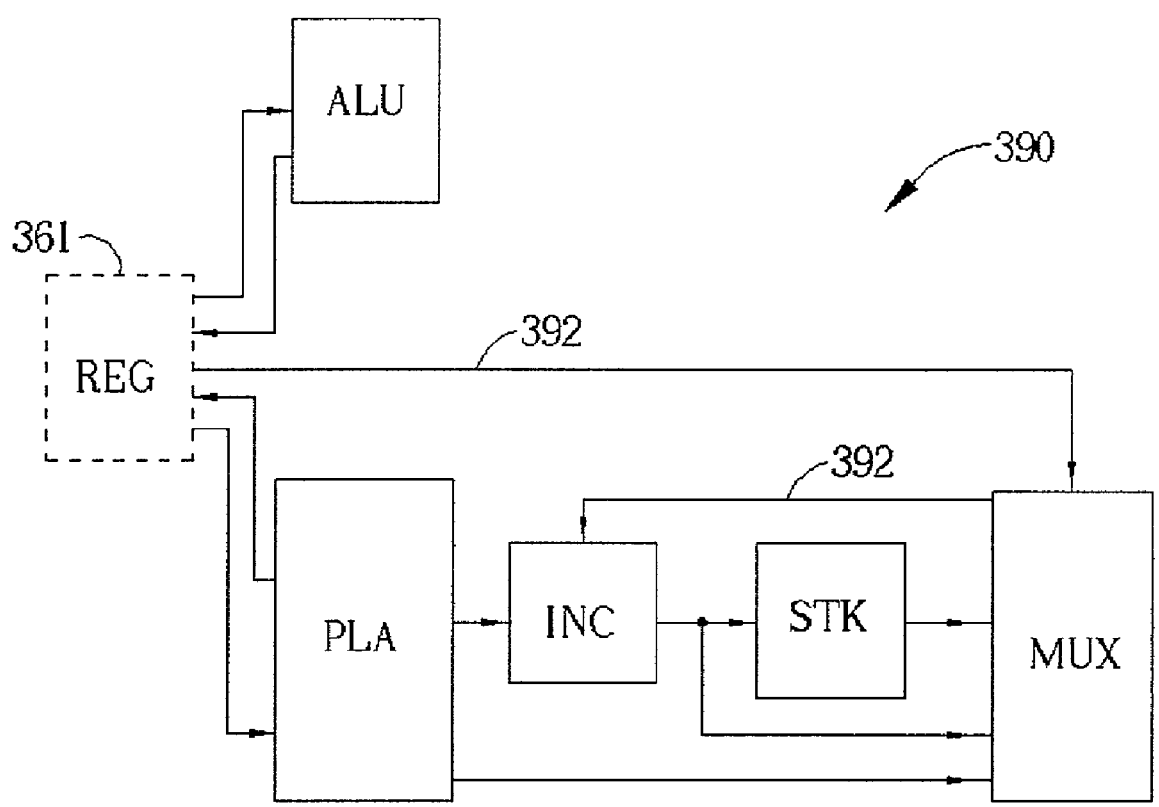
FIG. 16 illustrates a netlist as generated in FIG. 15 being displayed under a normal display mode of the present invention.

Please refer to FIGS. 15 and 16, with reference to FIGS. 11 and 5. The example netlist 210 of FIG. 11 is assumed, with the corresponding topology display mode 244 schematic 350. The user selects a component 212 labeled "REG" by way of the component selection function 232, and then invokes the fan-out template function 235. A new schematic 380 is generated, as shown in FIG. 15. The fan-out template function 235 modifies the netlist 210 so that the selected component 212 is placed at a left-most position in the schematic 380, and the remaining components 212 are positioned to the left of the selected component 212 (labeled "REG" as dotted box 381). The relative connectivity of the components 212 is indicated by their placement. Components 212 that are strongly connected are more closely positioned with respect to each other, with the primary connectivity consideration being given to the selected component 212. The components 212 labeled "ALU" and "PLA" are thus positioned closely to the component 212 labeled "REG". The positions of the remaining components 212 are determined by their interrelated connectivity characteristics. For example, component 212 labeled "INC" is properly positioned between components 212 labeled "PLA" and "STK", as it is a load for "PLA" and a driver for "STK". FIG. 16 illustrates the netlist 210, as generated in FIG. 15, viewed under the normal display mode 242 to present a schematic 390. Connection lines 214, as represented by arrows 392, have been auto-routed by the auto-router 260 just prior to switching into the normal display mode 242.

Figure 17:
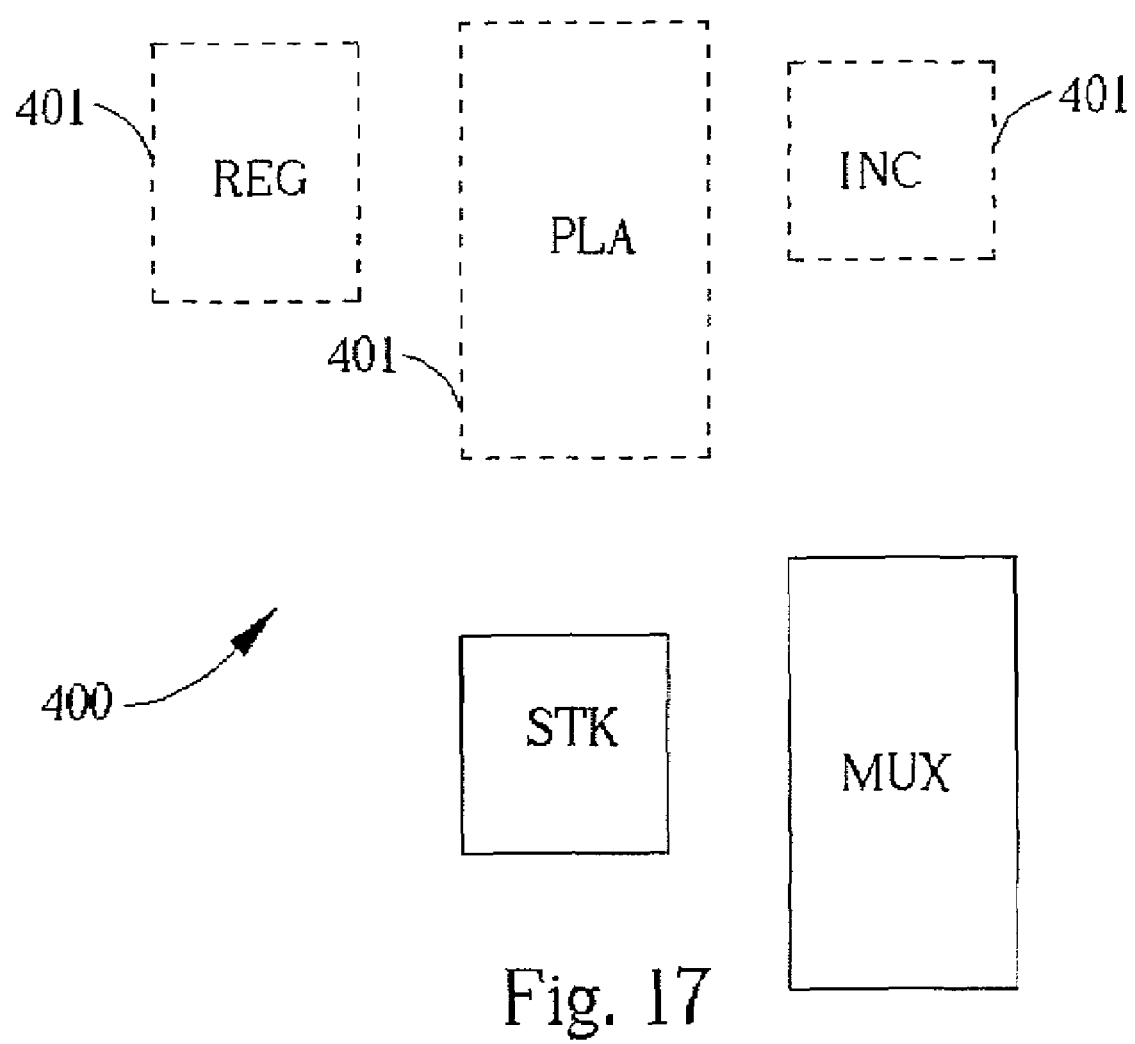
FIG. 17 illustrates a schematic presented under a topology display mode of the present invention generated by a path template function of the present invention.
Figure 18:
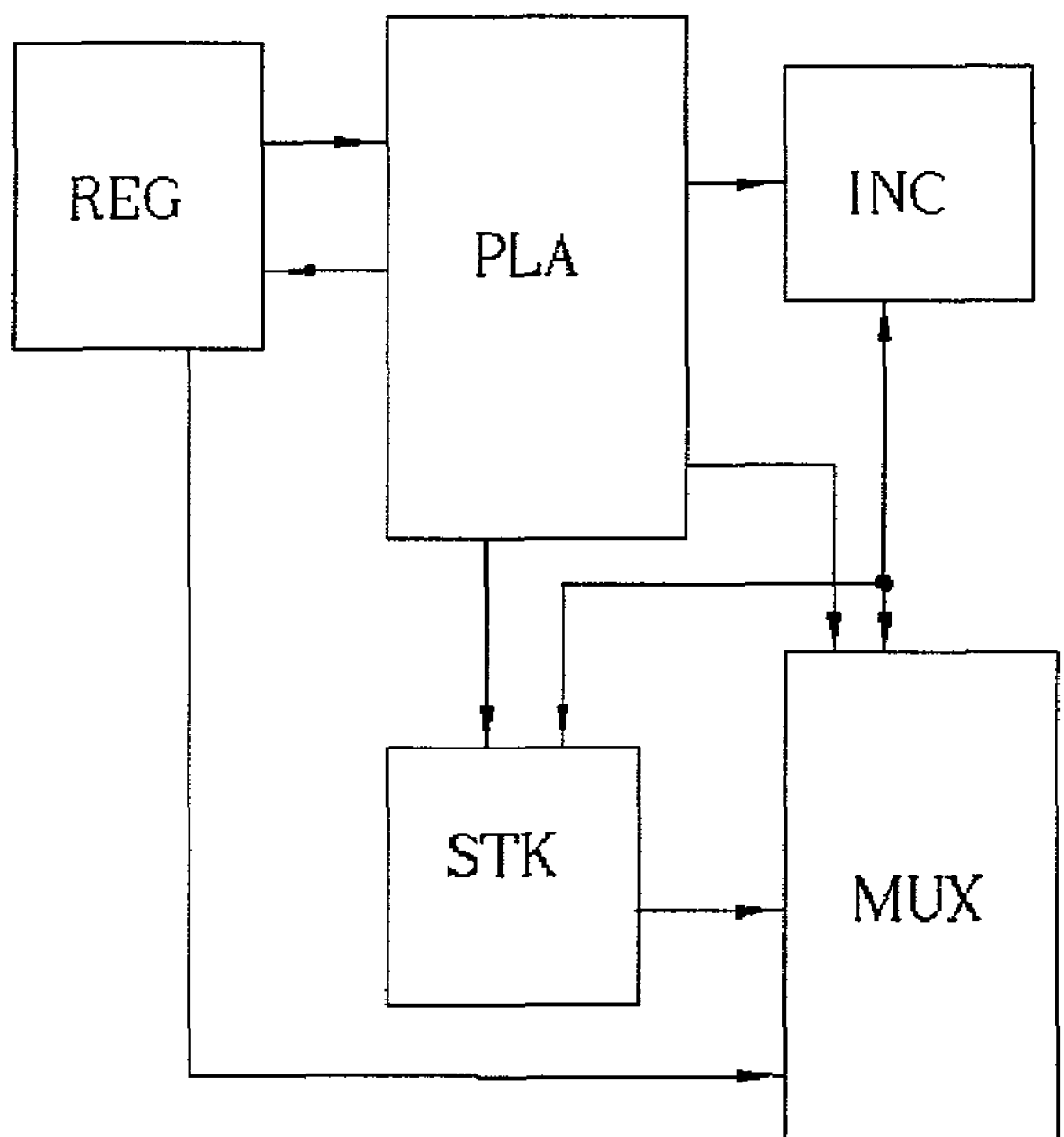
FIG. 18 illustrates a netlist as generated in FIG. 17 being displayed under a normal display mode of the present invention.

Please refer to FIG. 17 and FIG. 18. FIG. 17 illustrates the example schematic 350 of FIG. 11 displayed as a new schematic 400 under the topology display mode 244 with three selected components 212 after the path template function 236 has been invoked. The selected components 212 are indicated in the schematic 400 by dotted boxes 401. The path template function 236 modifies the netlist 210 so that the selected components 212 are arrayed in a path structure, which is typically a single row of the selected components 212. The other components 212 are then arrayed around this path structure according to their connectivity with the selected components 212. FIG. 18 illustrates the netlist 210 of FIG. 17 as viewed under the normal display mode, with the connection lines 214 being auto-routed by the auto-router 260.

Figure 19:
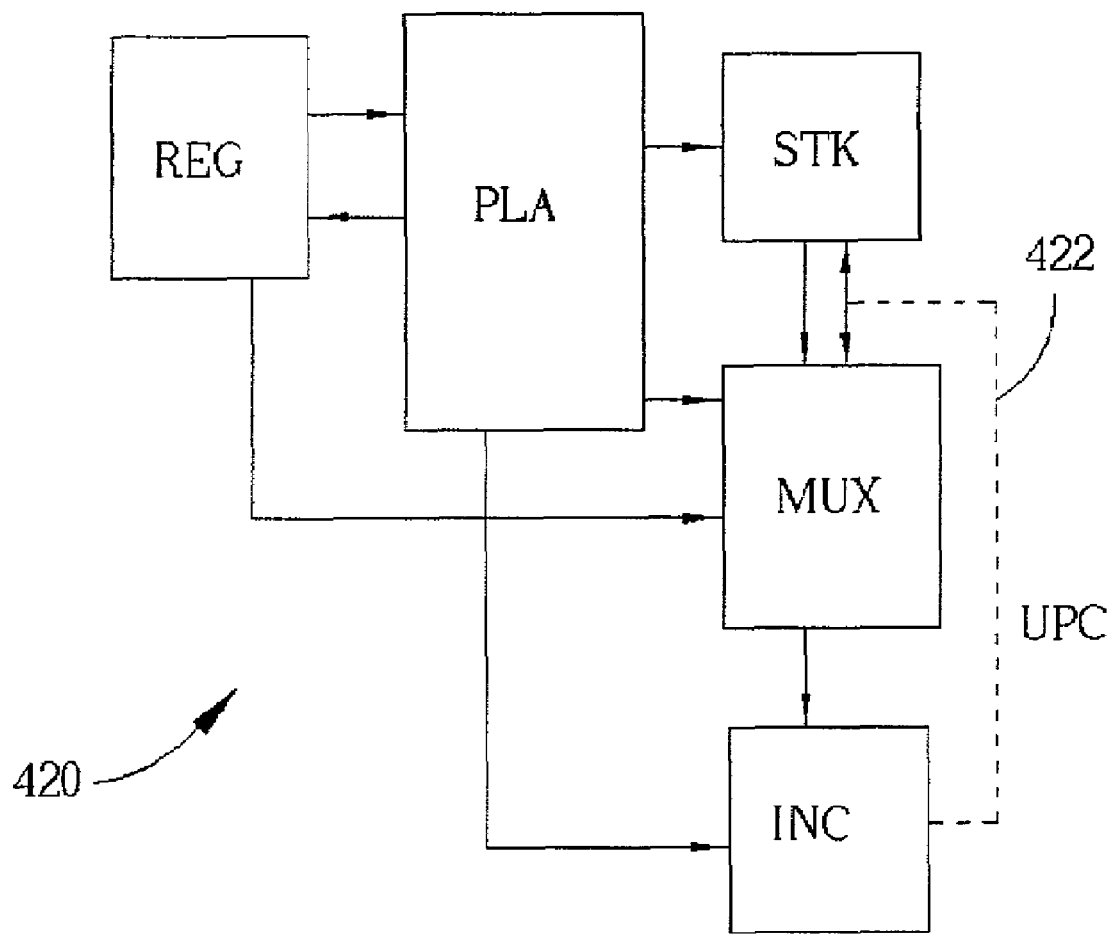
FIG. 19 illustrates example template, viewed under a normal display mode of the present invention, with a single user-selected connection line, presenting a schematic on a display.
Figure 20:
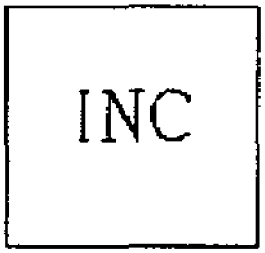
FIG. 20 illustrates a netlist of FIG. 19 viewed under a topology display mode of the present invention after a bus template function of the present invention has been invoked.
Figure 20:
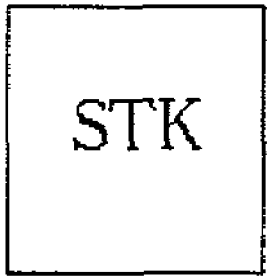
Figure 20:
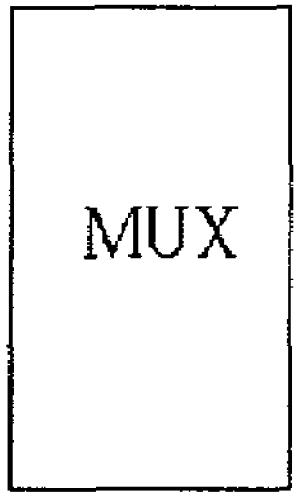
Figure 20:
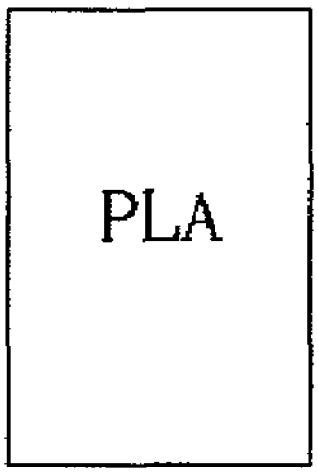
Figure 20:
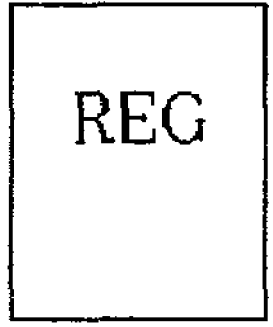
Figure 21:
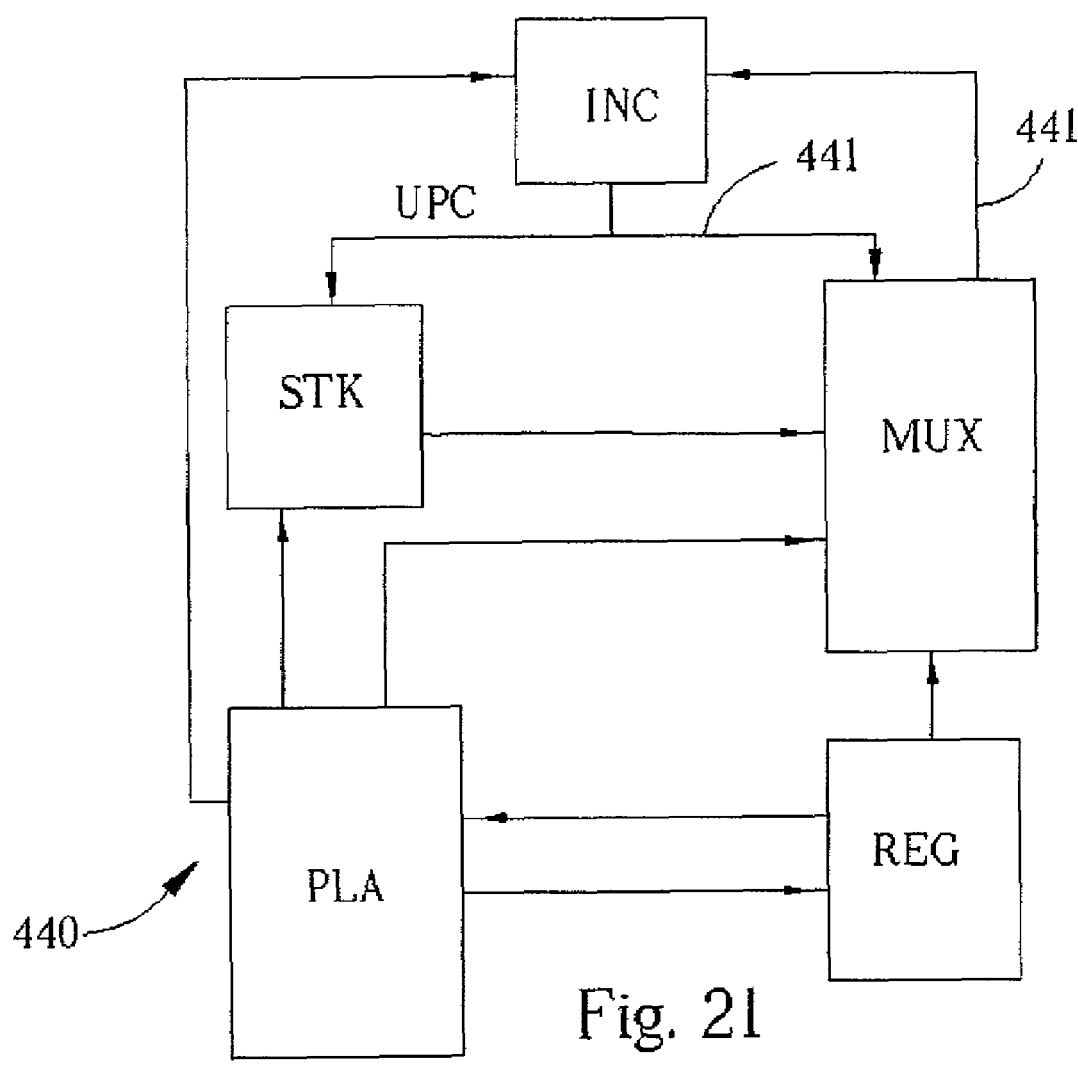
FIG. 21 shows a schematic for a netlist of FIG. 20, as presented by a normal display mode of the present invention.

Please refer to FIG. 19. FIG. 19 illustrates an example template 210, viewed under the normal display mode 242, with a single user-selected connection line 214, presenting a schematic 420 on the display 20. The line selection function 231 is used to select a connection line 214, which is indicated in the schematic 420 by a dotted line, and is labeled "UPC". FIG. 20 illustrates the netlist 210 of FIG. 19 viewed under the topology display mode 244 after the bus template function 237 has been invoked. The bus template function 237 modifies the netlist 210 so that components 212 that are directly connected to the user-selected connection line 214 (i.e., are a load or driver component 212 of the user-selected connection line 214, and may be termed connected components 212) are arrayed in two rows, one row each on either side of the user-selected connection line 214. The other components 212 are then arrayed around these connected components 212 according to their connectivity with the connected components 212. FIG. 21 shows a schematic 440 for the netlist 210 of FIG. 20, as presented by the normal display mode 242. Connection lines 214, as represented by arrows 441 in the schematic 440, have been auto-routed by the auto-router 260.

Figure 22:
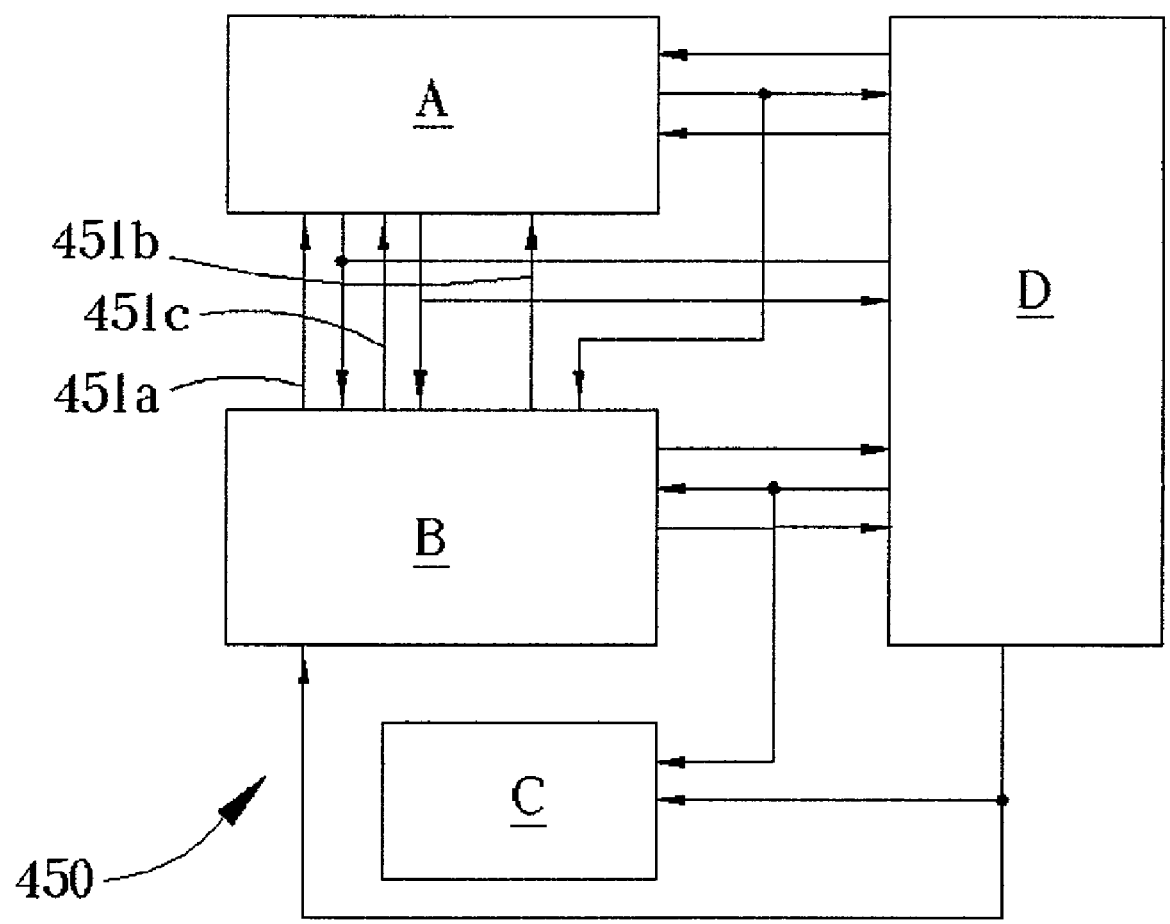
FIG. 22 is a schematic for an example netlist.
Figure 23:
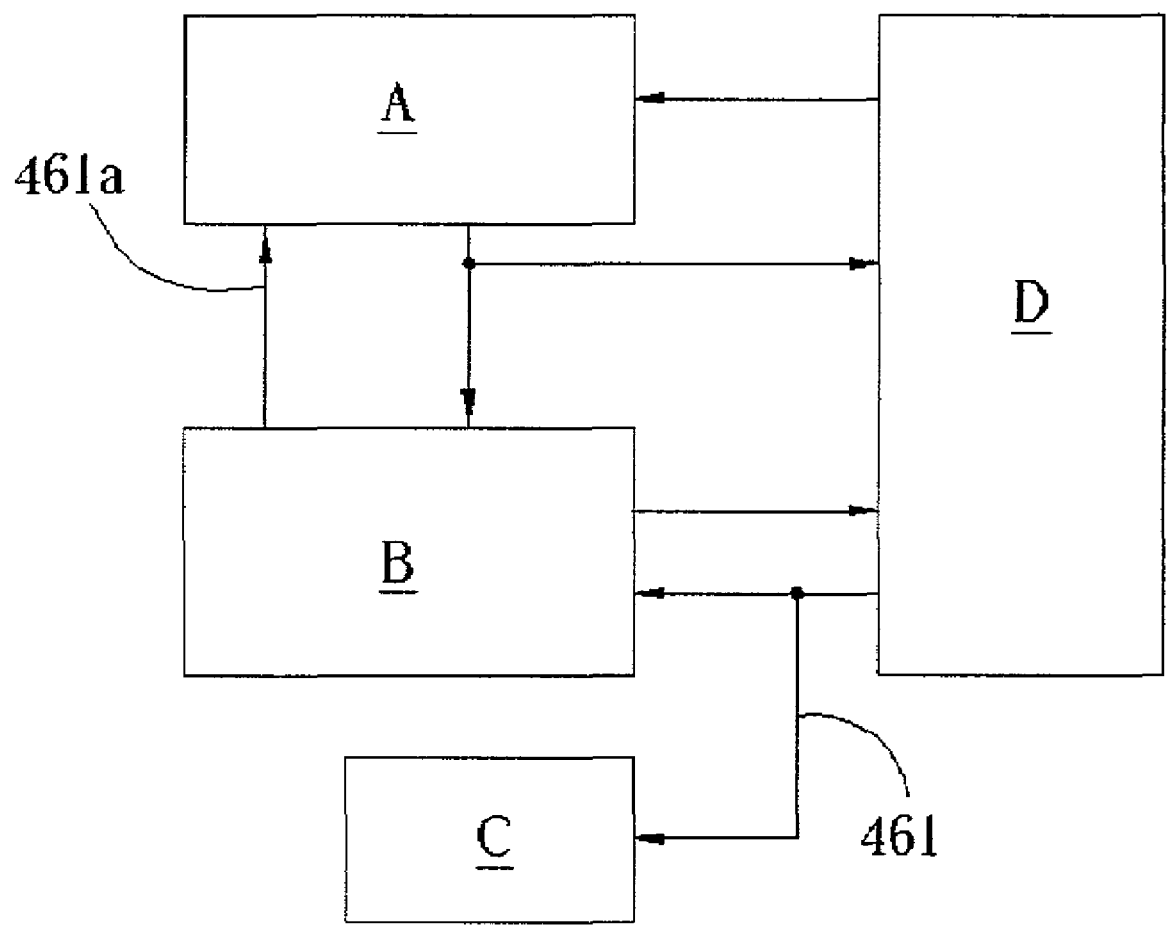
FIG. 23 and FIG. 24 illustrate an auto-routing grouping process utilized by an auto-router of the present invention, as applied to a netlist of FIG. 22.
Figure 24:
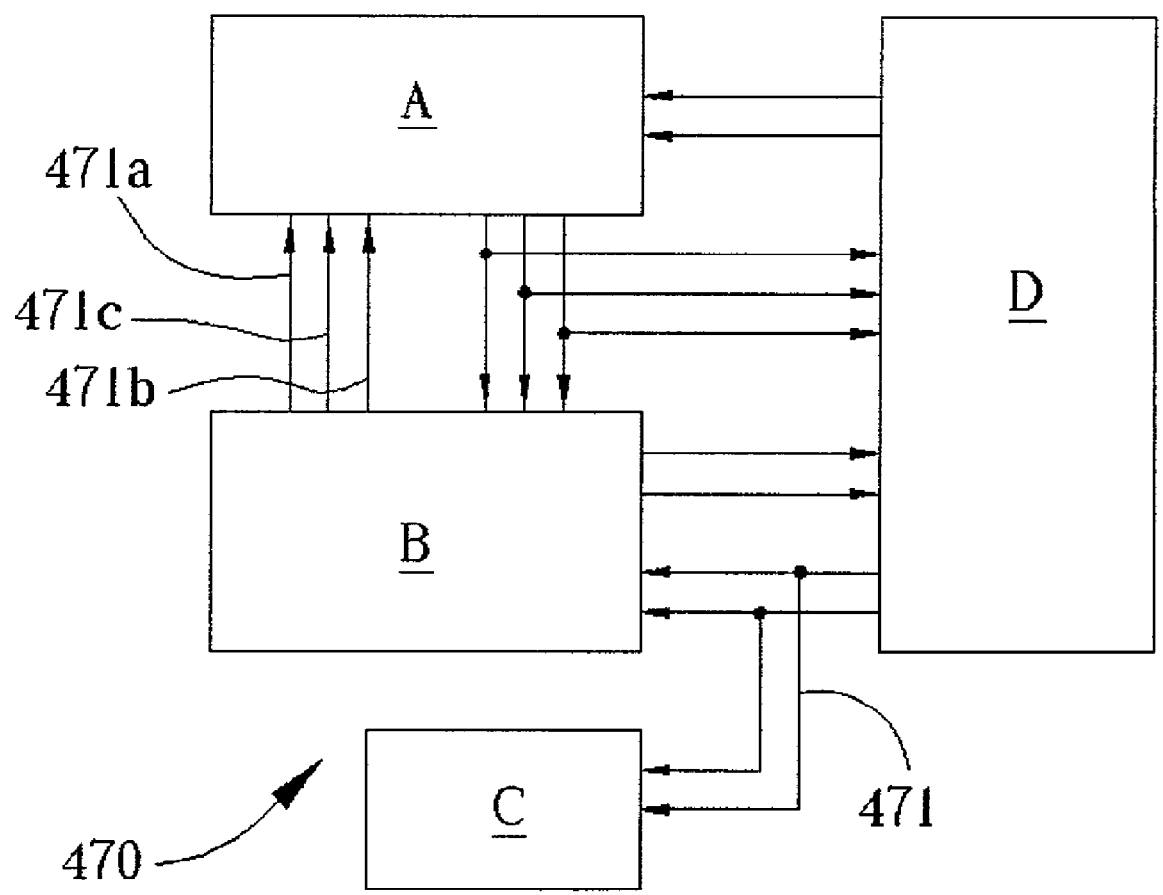

The auto-router 260 of the present invention has the ability to group connection lines 214 based upon their class 252 to generate more readable schematics. Please refer to FIG. 22. FIG. 22 is a schematic 450 for an example netlist 210 that may, for example, have been imported from a higher-level language from the load and save module 220. As can be seen in FIG. 22, the connection lines 214 have routing data 214c that does not lend itself to a quick understanding of the connectivity characteristics of the various components 212, as represented by boxes A, B, C and D. However, as discussed earlier in the context of the abstract display mode 246, the connection line classifier 252 places each connection line 214 into a class 252 according to the driver/load characteristic of the connection line 214. For example, connection lines 214 as represented by arrows 451a, 451b and 451c would belong to the same class 252, as they have the same driver/load characteristic, being driver lines from box B, and load lines to box A. The classes 252 are individually considered by the auto-router 260 as routing groups. Please refer to FIG. 23 and FIG. 24. FIGS. 23 and 24 illustrate an auto-routing grouping process utilized by the auto-router 260. For each class 252, the auto-router 260 runs a single routing line 461 from the driver component 212 to the load component 212 of that class 252. These routing lines 461 are routed in an intelligent manner so as to not run over the boxes A, B, C, D or any other components 212 in the netlist 210. Routing lines 461 may, however, cross each other. Such intelligent routers are known in the art of computer aided design/computer aided manufacturing (CAD/CAM), for example for electronic circuit board traces. However, the present invention intelligent router is free to select the locations of floating pins 214L and 214D, providing for greater flexibility during routing considerations. Each routing line is then split into a number of lines, each line corresponding to a single connection line 214 in the class 252 associated with the routing line 461. FIG. 24 illustrates a schematic 470 after this splitting process has been performed to generate connection lines 214 with routing data 214c that groups the connection lines 214 according to their driver/load characteristics, as shown by arrows 471. For example, a routing line 461a corresponds to a class 252 with three connection lines 214, indicated by arrows 451a, 451b and 451c of FIG. 22. This routing line 461a is split into three lines, whose routing characteristics are then respectively assigned as routing data 214c for the associated connection lines 214. The connection lines 214 corresponding to the routing line 461a are thus grouped together, as shown by arrows 471a, 471b and 471c. This process is repeated for all connection lines 214 in all classes 252, resulting in a netlist 210 that generates the schematic 470. The data flow of schematic 470 is clearly easier to understand than that for equivalent schematic 450. Pins 214L and 214D are usually floating, which better enables the auto-router 260 to route connection lines 214. As the edge size of a component 212 may be limited, and as a single edge may not have enough length to hold all of the pins 214L, 214D assigned to that edge, the auto-router 260 is free to break routing groups (i.e., classes 252) into smaller sub-groups to accommodate the restriction of the number of pins 2141, 214D that may be assigned to an edge of a component 212, and assign a routing line 461 to each of these sub-groups. This auto-grouping and auto-routing of connection lines 214 offers a significant savings of both time in effort to the user when routing connection 214 between components 212.

Figure 25:
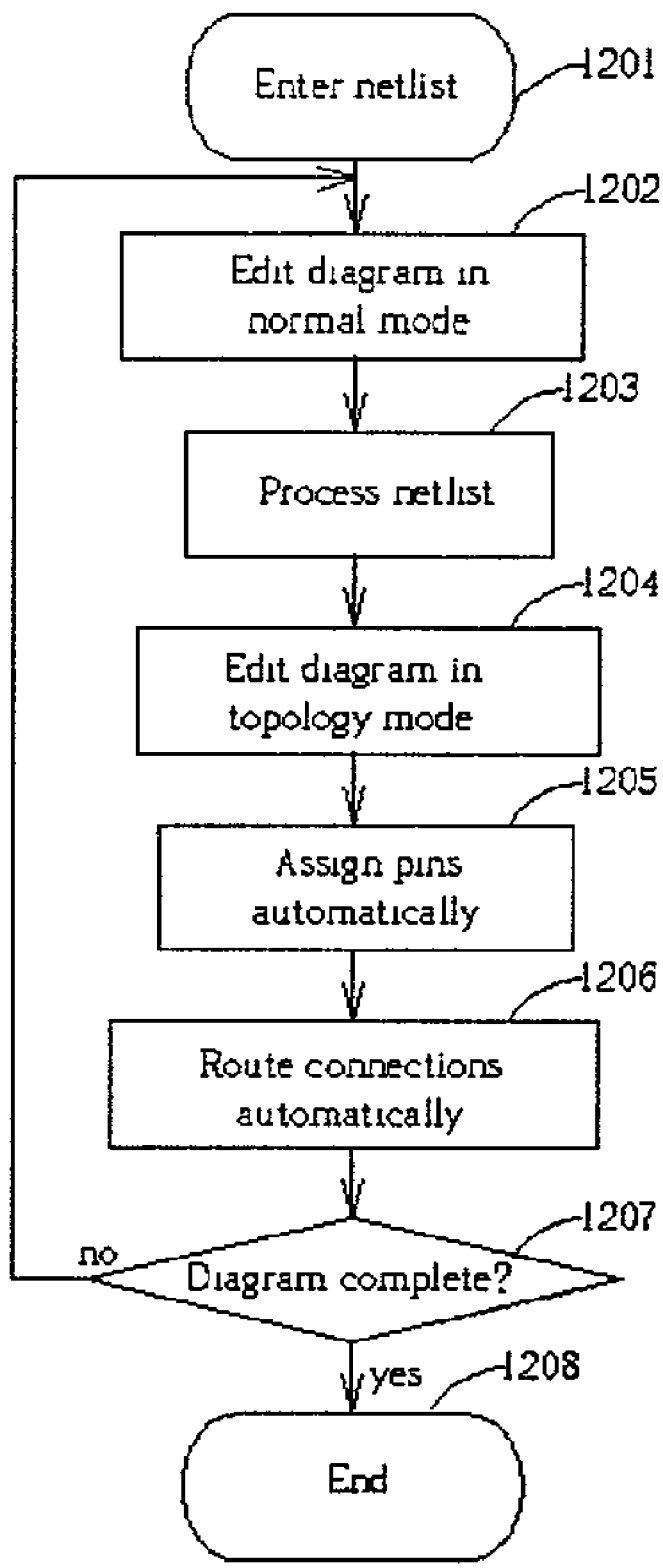
FIG. 25 is a flow chart for creating a schematic diagram according to the present invention.

The preferred program flow for the schematic editing program 200 is now discussed. Please refer to FIG. 25. FIG. 25 is a flow chart for creating a schematic diagram according to the present invention. Typically, the user begins the diagram creation process by inputting a netlist 210 from other systems, databases, or files, or by creating the netlist 210 in the normal display mode 242 using various types of connection creation functions, such as "line creation", "component creation", "make connection", sizing and positioning operations, etc. In step 1201, initial netlist information 210 is obtained, which can be later modified in step 1202 as the user desires by adding or deleting connections lines 214, components 212, etc. The netlist 210 should be a valid netlist 210 before entering the topology display mode 244. Hence, step 1203 processes and validates the netlist 210. The netlist 210 is then stored in an internal database within the memory 60 for later reference. In step 1204, the user enters into the topology display mode 244 to perform editing of the components 212. Prior to returning back to editing in the normal display mode 242 of step 1202, the pins 214L and 214D are assigned in step 1205, and the routing data 214c is automatically determined for each connection line 214 by the auto-router 260 in step 1206. In step 1207, if the user is finished editing the schematic diagram, the program 200 terminates at step 1208. Otherwise, the entire editing process can be repeated.

Figure 26:
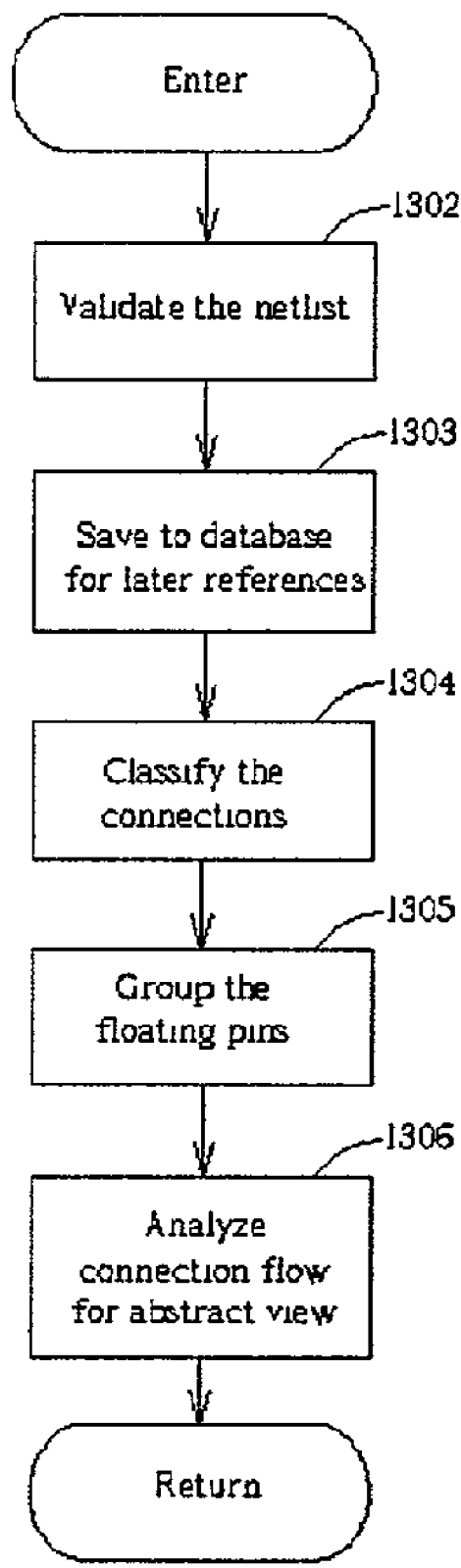
FIG. 26 shows details of a netlist processing step in FIG. 25.

Please refer to FIG. 26. FIG. 26 shows details of the netlist processing step 1203 of FIG. 25. Validation of the netlist 210 is performed in step 1302, and the netlist 210 is saved to the database in step 1303. The netlist 210 is then analyzed by the connection line classifier 250 to classify the connection lines 214 (step 1304), to group the floating pins (step 1305), and to prepare the abstract lines used in the abstract display mode 246 (step 1306). The classes 252 are based on their related connected components 212 and connection directions (i.e., driver or load). If the connection lines 214 are not directed (i.e., do not explicitly have a driver or load relationship with their related components 212), then only the connected elements 212 associated with the connection line 214 are considered.

Figure 27:
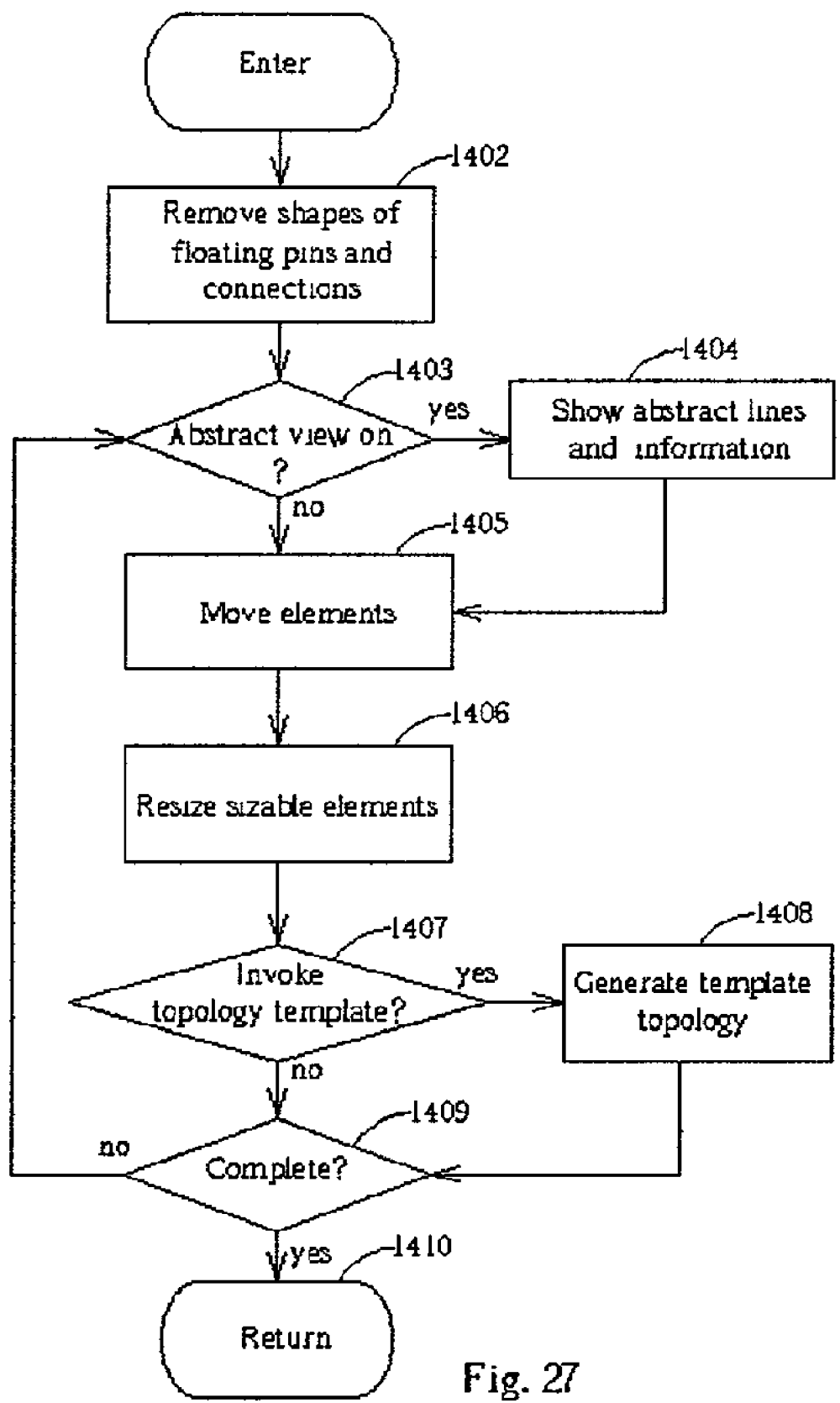
FIG. 27 shows details of a step in FIG. 25 that is concerned with editing while in a topology display mode of the present invention.

Please refer to FIG. 27. FIG. 27 shows details of step 1204 in FIG. 25 that is concerned with editing while in the topology display mode 244. While in the topology display mode 244, all symbols for connection lines 214 and pins 214L, 214D are removed from the display 20 (step 1402), so as to enable the user to concentrate simply on the topology of the components 212. Step 1403 considers the case that the abstract display mode 246 is active. If so, then the abstract lines and associated abstract information are drawn in step 1404. In steps 1405 and 1406, the user is free to change the position 212a and size 212b of components 212, respectively, thereby enabling the user to manually change the topology of the schematic as defined by the netlist 210. Alternatively, step 1407 concerns itself with whether or not the user wishes to invoke one of the topology template functions 233–237. If so, the appropriate template topology function 233–237 is performed in step 1408. In step 1409, the user may choose to exit the topology display mode 244 and return to editing in the normal display mode 242, as indicated in step 1410, or continue back to step 1403 to continue editing in the topology display mode 244.

Figure 28:
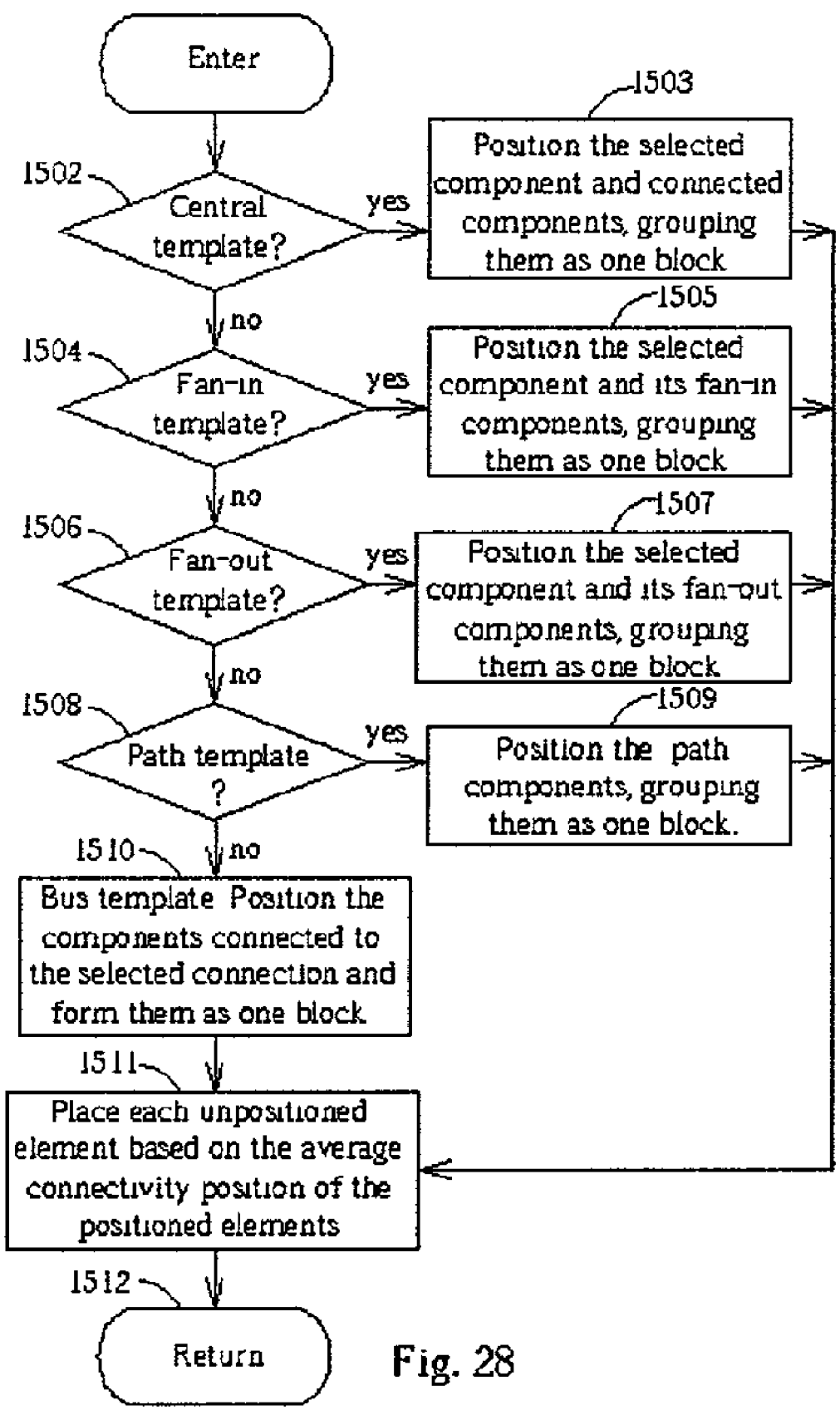
FIG. 28 details the steps taken in a step of FIG. 27 to generate template-based topologies.

Please refer to FIG. 28. FIG. 28 details the steps taken in step 1408 of FIG. 27 to generate template-based topologies. In step 1502, if the user invokes the central template function 233, then, in step 1503, the selected component 212 and all components 212 directly connected to the selected component 212 are positioned first. The connected components 212 are placed around the selected component 212. The selected and connected components 212 are then treated as a block of components 212 to prevent them from being broken up or separated by the subsequent placement of the remaining components 212 in step 1511. These remaining components 212 are positioned in step 1511 so that their midpoints correspond to their related connectivity with the block of components 212, and in such a manner that no overlapping of components 212 occurs. In step 1504, if the fan-in template function 234 is invoked, then in step 1505 the selected component 212 is placed in a right-most position, and other fan-in components 212 are placed left of the selected component 212 in a tiered manner. Any remaining components are positioned in step 1511. Similarly, the fan-out template function 235 is considered in steps 1506 and 1507. The fan-out template function 235 places the selected component 212 at a left-most position, and other fan-out components 212 are placed to the right in tiered manner. Step 1511 takes care of the positioning of any remaining components 212. Both fan-in 234 and fan-out 235 template functions apply a depth first search to determine the level (i.e., tier) information of the fan-in and fan-out components 212. Steps 1508 and 1509 handle the path template function 236, which places the selected components 212 that define a path into a single row. Step 1511 positions the remaining components 212. In step 1508, if the path template function 236 is not invoked, then, with all other options exhausted, it is assumed that the user is invoking the bus template function 237. In step 1510, the bus template function 237 places components 212 connected to the specified connection line 214 into two rows. Step 1511 positions the remaining components 212.

Figure 29:
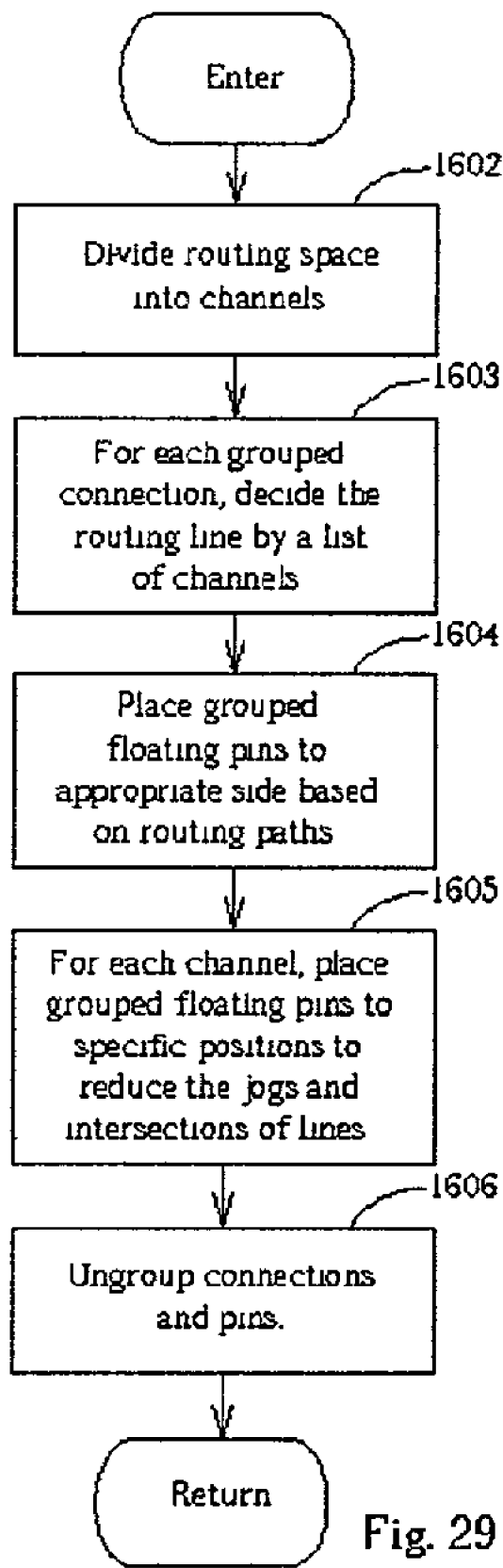
FIG. 29 details steps taken by a present invention auto-router.

Once editing under the topology display mode 244 is finished, the user can switch back to the normal display mode 242. Before entering the normal display mode 242, the schematic editing program 200 will invoke automatic pin assignment (step 1205) and connection line 214 routing (step 1206) by way of calling the auto-router 260. Please refer to FIG. 29, which details the steps taken by the auto-router 260. In step 1602, the auto-router 260 divides the routing space (which is space not occupied by components 212) into a set of channels, which are rectangle routing spaces that have pins 214L, 214D placed only on two opposite sides. Then, based on the classes 252, the auto-router, in step 1603, decides the routing line for each class 252. This can be done by any Steiner tree based algorithm under the constraints of the edge capacity of the components 212 and the routing capacity of the channels. The result is a list of channels for each class 252. After the routing lines are determined, in step 1604, the sides of the components 212 for placement of the grouped floating pins 214L, 214D are determined. In step 1605, the positions of the grouped floating pins 214L, 214D are adjusted for each channel to reduce jogs and intersections of lines. Finally, in step 1606, the grouped connection lines 214 and floating pins 214L, 214D are ungrouped (i.e., the routing line is split), and the position of each floating pin 214L, 214D is determined.

In contrast to the prior art, the present invention, provides a topology display mode that eliminates connection lines from the display to better enable a user to view the topology of components. The present invention further provides an abstract display mode, which is combinable with the topology display mode, that provides a quick visual cue of the connectivity of the various components in schematic diagram. The abstract view can also provide summary information about the connectivity of one component with another. The present invention also provides a number of predefined topology template functions that arrange the topology of a schematic diagram according to the connectivity relationships between the various components. Finally, the present invention is capable of performing automatic pin assignment and routing of the connection lines to minimize the number of jags the connection lines have, and grouping the connection lines according to their component connectivity characteristics. The combined functionality as provided by the present invention enables a user to make quick and informed changes to the topology of a schematic.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for enabling a user to generate a schematic diagram on a computer system, the computer system comprising a display and an input device, the method comprising:

processing a netlist of a schematic diagram indicating connectivity of a plurality of components through connection lines to provide a normal display mode in which at least a portion of the components are presented on the display, and connection lines corresponding to the displayed components are presented on the display;

providing a topology display mode in which the at least a portion of the components are presented on the display without the corresponding connection lines;

providing a component selection function that enables a user to utilize the input device to select a particular component;

providing a topology editing function that enables the user to utilize the input device to edit the schematic diagram by modifying the relative positioning, sizing and connectivity of a selected component, wherein the topology editing function is combinable with the topology display mode to enable the user to modify the relative positioning or sizing of the selected component without viewing the corresponding connection lines; and providing automatic pin assignment and routing of the connection lines within the schematic diagram displayed in the normal mode according to the netlist;

wherein the user is capable of switching between the topology display mode and the normal display mode while editing the schematic diagram.

2. The method of claim 1 wherein the topology editing function changes the netlist to reflect corresponding changes made by the user to the relative positioning and connectivity of the components.

3. The method of claim 2 further comprising performing the automatic pin assignment and routing at a time that is after a change is made to the netlist and before entering the normal display mode.

4. The method of claim 1 further comprising grouping connection lines into classes according to a driver/load characteristic of each connection line.

5. The method of claim 4 further comprising providing an abstract display mode that presents on the display representations of ones of said components and a plurality of abstract lines between component representations, each abstract line respectively indicating connectivity of a corresponding one of said classes of connection lines between a first component and another of said components.

6. The method of claim 5 wherein each abstract line indicates a group of one or more connection lines having common driver/load characteristics.

7. The method of claim 6 further comprising providing abstract information on the display for an abstract line, the abstract information indicating the number of driver connection lines and load connection lines in the group of connection lines associated with the abstract line.

8. The method of claim 5 wherein the first component is the user-selected component.

9. The method of claim 5 wherein the abstract display mode is combinable with the topology display mode.

10. The method of claim 4 wherein the automatic pin assignment and routing of the connection lines comprises:
grouping together connection lines having common driver/load characteristics to form one or more routing groups;
for each routing group, utilizing a router to generate a routing line that routes between two components; and
splitting the routing line to provide a respective route and pin assignment for each connection line in the routing group.

11. The method of claim 10 wherein each connection line in each routing group shares the same driver component and the same load component.

12. The method of claim 10 wherein the netlist is modified to reflect the routing and pin assignment performed for each connection line.

13. The method of claim 1 wherein the topology editing function comprises a central template auto-arrange function that automatically arranges other components around a user-selected component according to the relative connectivity of the other components with the user-selected component.

14. The method of claim 1 wherein the topology editing function comprises a fan-in auto-arrange function that automatically arranges other components with respect to a user-selected component according to fan-in connectivity of the other components with the user-selected component.

15. The method of claim 14 wherein the user-selected component is placed in a right-most position with respect to the other components.

16. The method of claim 1 wherein the topology editing function comprises a fan-out auto-arrange function that automatically arranges other components with respect to a user-selected component according to fan-out connectivity of the other components with the user-selected component.

17. The method of claim 16 wherein the user-selected component is placed in a left-most position with respect to the other components.

18. The method of claim 1 wherein the topology editing function comprises a path auto-arrange function that automatically arranges user-selected components into a path structure, and arranges other components around the user-selected components according to the relative connectivity of the other components with the user-selected components.

19. The method of claim 1 further comprising:
providing a line selection function that enables the user to utilize the input device to select a particular connection line; and
providing a bus auto-arrange function that automatically arranges the components around a user-selected connection line according to the relative connectivity of the components with the user-selected connection line.

20. A computer system comprising a processor and memory, the memory holding a program adapted to perform the method of claim 1 and executable by the processor.

21. A computer readable media containing data that is adapted to be extractable for providing the program of claim 20.

22. A method enabling a user to edit a netlist describing a schematic diagram of a circuit formed by a set of components having pins, wherein the netlist describes a shape and a position within the schematic diagram representations of the components and indicates which component pins are interconnected by connection lines within the schematic diagram, the method comprising the steps of:
generating a display of a topology display mode schematic diagram showing representations of the components of shape and relative position within the schematic diagram described by the netlist but without showing any of the indicated connection lines;
altering the topology display mode schematic diagram in response to user input by one of adding a component representation to the schematic diagram, removing a component representation from the schematic diagram, altering a shape of a component representation in the schematic diagram, and altering a position of a component representation with the schematic diagram;
automatically altering the netlist so that its description of the schematic diagram is consistent with the altered topology display mode schematic diagram to produce an altered netlist;
generating a display of a normal display mode schematic diagram showing representations of the components of shape and relative position within the schematic diagram in accordance with the altered netlist and showing said connection lines;
altering the normal display mode schematic diagram in response to user input by one of adding a representation of a connection line to the schematic diagram and removing a representation of a connection line from the schematic diagram; and
automatically altering the netlist so that its description of the schematic diagram is consistent with the altered normal display mode schematic diagram wherein the user is capable of switching between the topology display mode and the normal display mode.

23. The method in accordance with claim 22 wherein the step of generating the display of the normal mode schematic diagram includes automatically routing each connection line within the display.

24. The method in accordance with claim 22 wherein the step of altering the normal display mode schematic diagram in response to user input by one of adding and removing a connection line comprises automatically routing an added connection line within the displayed normal display mode schematic diagram.

25. The method in accordance with claim 22 wherein the step of automatically altering the netlist so that its description of the schematic diagram is consistent with the altered topology display mode schematic diagram comprises altering the netlist to delete a description of a component representation removed from the topology display mode schematic diagram and to delete each indication of that component being interconnected by a connection line to any other component.

26. The method in accordance with claim 22 wherein the step of altering the topology display mode schematic diagram in response to user input comprises automatically repositioning representations of components within the topology display mode schematic diagram relative to an order in which the netlist indicates component pins are interconnected by connection lines.

27. The method in accordance with claim 22 further comprising the step of:
generating a display of an abstract schematic diagram showing representations of the components of shape and relative position within the schematic diagram in accordance with the altered netlist, showing a set of abstract lines interconnecting pins pairs of the component representations, wherein each abstract line interconnecting a pair of component representations represents a group of more than one of the connection lines interconnecting that pair of component representations.

28. The method in accordance with claim 27 wherein the display of the abstract schematic diagram also includes an indication of a number of connection lines each abstract line represents.

29. Computer-readable media containing software which, when read and executed by a computer causes the computer to carry out a method enabling a user to edit a netlist describing a schematic diagram of a circuit formed by a set of components having pins, wherein the netlist describes a shape and a position within the schematic diagram representations of the components and indicates which component pins are interconnected by connection lines within the schematic diagram, wherein the method comprises the steps of:
generating a display of a topology display mode schematic diagram showing representations of the components of shape and relative position within the schematic diagram as described by the netlist but without showing any of the indicated connection lines;
altering the topology display mode schematic diagram in response to user input by one of adding a component representation to the schematic diagram, removing a component representation from the schematic diagram, altering a shape of a component representation in the schematic diagram, and altering a position of a component representation with the schematic diagram;
automatically altering the netlist so that its description of the schematic diagram is consistent with the altered topology display mode schematic diagram to produce an altered netlist;
generating a display of a normal display mode schematic diagram showing representations of the components of shape and relative position within the schematic diagram in accordance with the altered netlist and showing said connection lines;
altering the normal display mode schematic diagram in response to user input by one of adding a representation of a connection line to the schematic diagram and removing a representation of a connection line from the schematic diagram; and
automatically altering the netlist so that its description of the schematic diagram is consistent with the altered normal display mode schematic diagram wherein the user is capable of switching between the topology display mode and the normal display mode.

30. The computer-readable media in accordance with claim 29 wherein the step of generating the display of the normal mode schematic diagram includes automatically routing each connection line within the display.

31. The computer-readable media in accordance with claim 29 wherein the step of altering the normal display mode schematic diagram in response to user input by one of adding and removing a connection line comprises automatically routing an added connection line within the displayed normal display mode schematic diagram.

32. The computer-readable media in accordance with claim 29 wherein the step of automatically altering the netlist so that its description of the schematic diagram is consistent with the altered topology display mode schematic diagram comprises altering the netlist to delete a description of a component representation removed from the topology display mode schematic diagram and to delete each indication of that component being interconnected by a connection line to any other component.

33. The computer-readable media in accordance with claim 29 wherein the step of altering the topology display mode schematic diagram in response to user input comprises automatically repositioning representations of components within the topology display mode schematic diagram relative to an order in which the netlist indicates component pins are interconnected by connection lines.

34. The computer-readable media in accordance with claim 29 wherein the method further comprises the step of:
generating a display of an abstract schematic diagram showing representations of the components of shape and relative position within the schematic diagram in accordance with the altered netlist, showing a set of abstract lines interconnecting pins pairs of the component representations, wherein each abstract line interconnecting a pair of component representations represents a group of more than one of the connection lines interconnecting that pair of component representations.

35. The computer-readable media in accordance with claim 34 wherein the display of the abstract schematic diagram also includes an indication of a number of connection lines each abstract line represents.

* * * * *

UNITED STATES PATENT AND TRADEMARK OFFICE
CERTIFICATE OF CORRECTION

PATENT NO. : 6,980,211 B2  
APPLICATION NO. : 10/064035  
DATED : December 27, 2005  
INVENTOR(S) : Kevin E. Spaulding et al.

Page 1 of 1

It is certified that error appears in the above-identified patent and that said Letters Patent is hereby corrected as shown below:

Column 9, line 37, Claim 14     Please replace "The method of claim 1" with --The method of claim 17--

Column 10, line 33, Claim 18     Pleaase replace "The method of claim 17" with --The method of claim 1--

Signed and Sealed this

Seventeenth Day of October, 2006

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,980,211 B2 | Page 1 of 1 |
| APPLICATION NO. | : 10/064035 | |
| DATED | : December 27, 2005 | |
| INVENTOR(S) | : Shyh-Chang Lin et al. | |

It is certified that error appears in the above-identified patent and that said Letters Patent is hereby corrected as shown below:

This certificate supersedes Certificate of Correction issued October 17, 2006, should be vacated since no Certificate of Correction was granted for this patent number.

Signed and Sealed this

Twenty-first Day of November, 2006

JON W. DUDAS
*Director of the United States Patent and Trademark Office*